US008461961B2

(12) United States Patent
Wu

(10) Patent No.: US 8,461,961 B2
(45) Date of Patent: Jun. 11, 2013

(54) TAMPER-PROOF SECURE CARD WITH STORED BIOMETRIC DATA AND METHOD FOR USING THE SECURE CARD

(76) Inventor: Ming-Yuan Wu, Taipei (TW)

( * ) Notice: Subject to any disclaimer, the term of this patent is extended or adjusted under 35 U.S.C. 154(b) by 561 days.

(21) Appl. No.: 12/612,385

(22) Filed: Nov. 4, 2009

(65) Prior Publication Data

US 2011/0102141 A1 May 5, 2011

(51) Int. Cl.
*G05B 19/00* (2006.01)
(52) U.S. Cl.
USPC ........... 340/5.82; 340/5.83; 340/5.8; 340/5.6; 340/5.41; 340/5.52; 382/115; 382/116; 382/124
(58) Field of Classification Search
USPC ............... 382/115, 116, 124; 340/5.83, 5.82, 340/5.2, 5.41, 5.52, 5.53, 5.8, 5.6; 705/35, 705/74, 54, 315; 235/487, 380, 492
See application file for complete search history.

(56) References Cited

U.S. PATENT DOCUMENTS

| 3,412,493 | A | * | 11/1968 | French | 283/85 |
| 3,928,842 | A | * | 12/1975 | Green et al. | 382/124 |
| 4,253,086 | A | * | 2/1981 | Szwarcbier | 382/126 |
| 6,857,210 | B2 | * | 2/2005 | Santa Cruz | 40/124.06 |
| 7,039,223 | B2 | * | 5/2006 | Wong | 382/124 |
| 7,431,207 | B1 | * | 10/2008 | Neemann et al. | 235/380 |
| 7,607,583 | B2 | * | 10/2009 | Berardi et al. | 235/487 |
| 2003/0179910 | A1 | * | 9/2003 | Wong | 382/115 |
| 2004/0254894 | A1 | * | 12/2004 | Tsuei et al. | 705/74 |
| 2004/0260653 | A1 | * | 12/2004 | Tsuei et al. | 705/54 |
| 2005/0232471 | A1 | * | 10/2005 | Baer | 382/115 |
| 2008/0052244 | A1 | * | 2/2008 | Tsuei et al. | 705/74 |
| 2009/0167492 | A1 | * | 7/2009 | Madafferi et al. | 340/5.82 |

* cited by examiner

*Primary Examiner* — Hai Phan
*Assistant Examiner* — Peter Mehravari
(74) *Attorney, Agent, or Firm* — Muncy, Geissler, Olds & Lowe, PLLC

(57) ABSTRACT

A tamper-proof secure card comprising biometric data of an individual for identifying or confirming authority of the individual. Prior to issuing the secure card a cardholder's biometric data is stored in a transparent biometric data section of the secure card. Also, a unique card number is created using a cardholder's biometric data and stored in the card. When the secure card is used the cardholder inputs biometric data. This input biometric data is then compared to the biometric data stored in the card. If the input biometric data matches the stored biometric data the identity of the cardholder is confirmed. If the cardholder's identity has been confirmed the unique card number can be accessed. Without confirmation the unique card number cannot be access. The secure card also comprises a transparent input area to separate the cardholder from an identity verification machine.

3 Claims, 36 Drawing Sheets

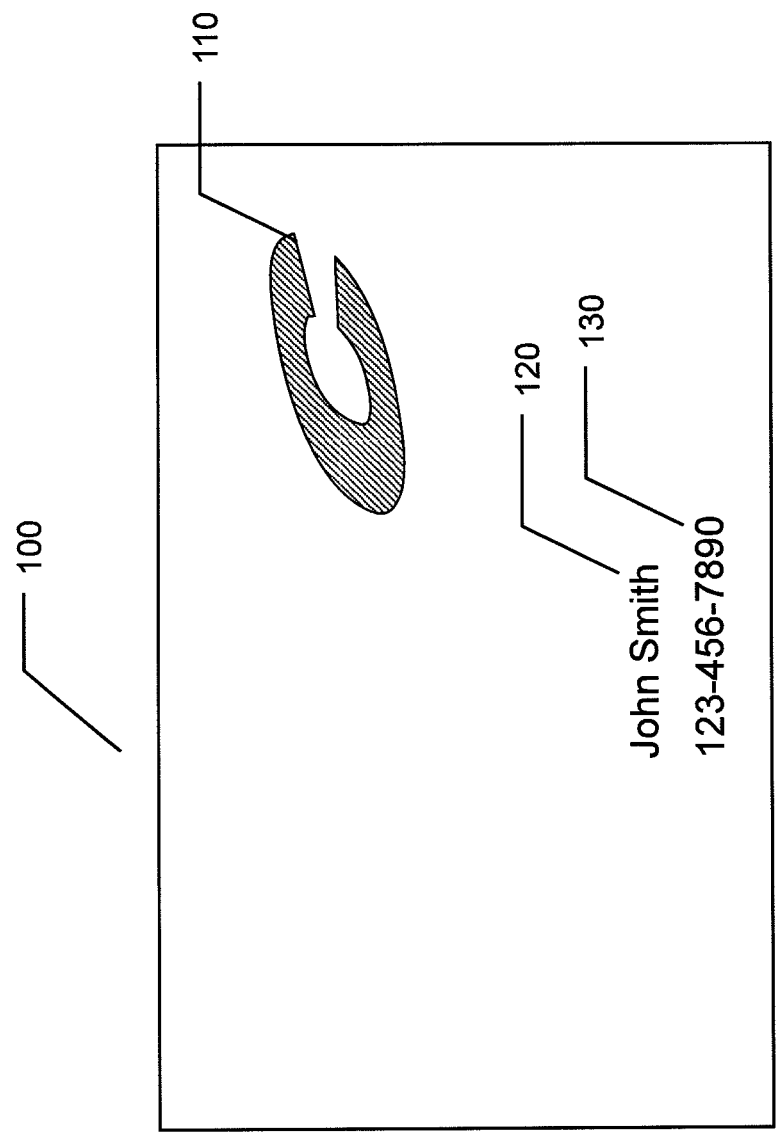
Figure 1A – Prior Art

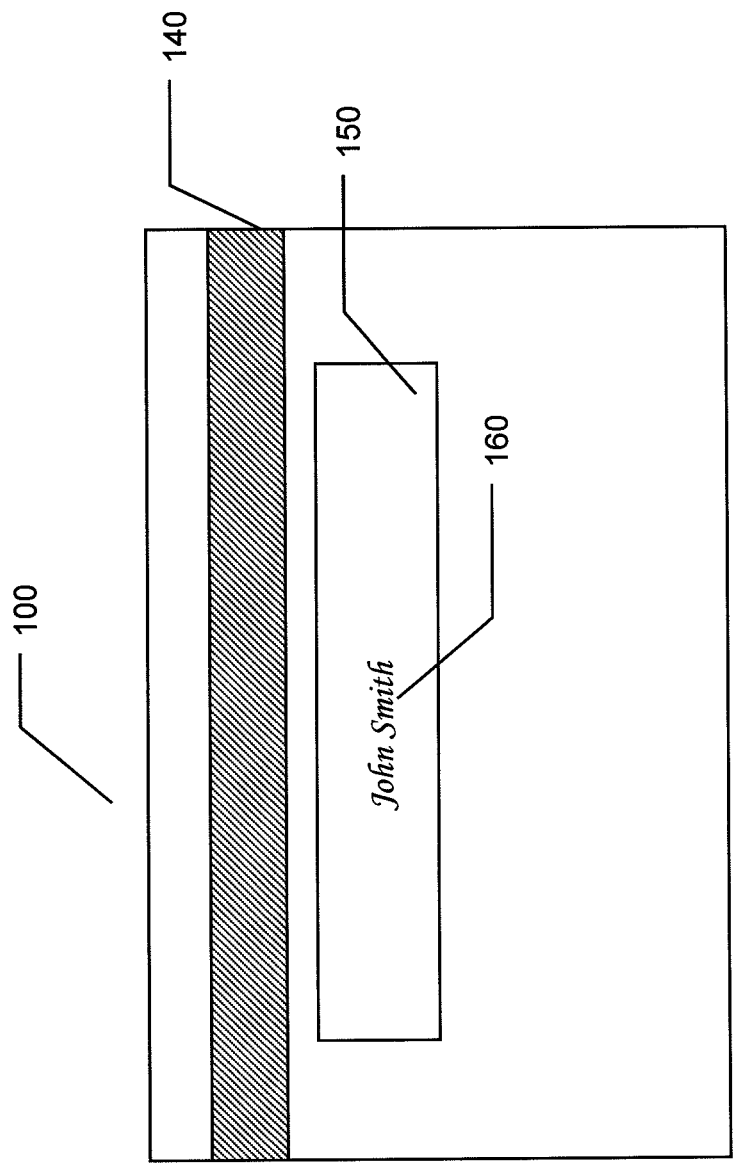
Figure 1B – Prior Art

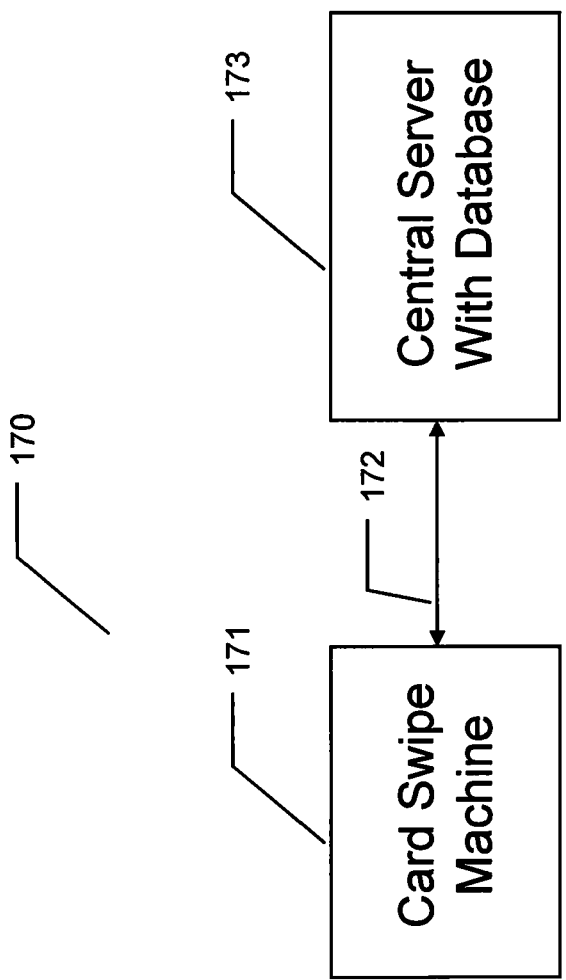
Figure 1C – Prior Art

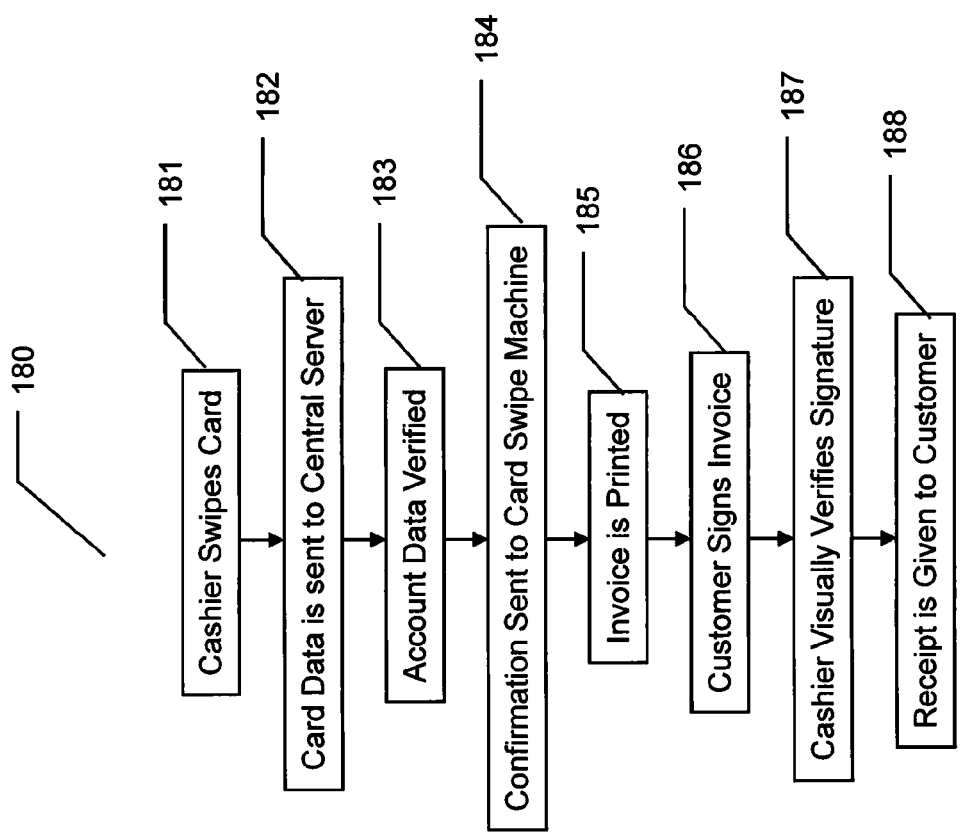
Figure 1D – Prior Art

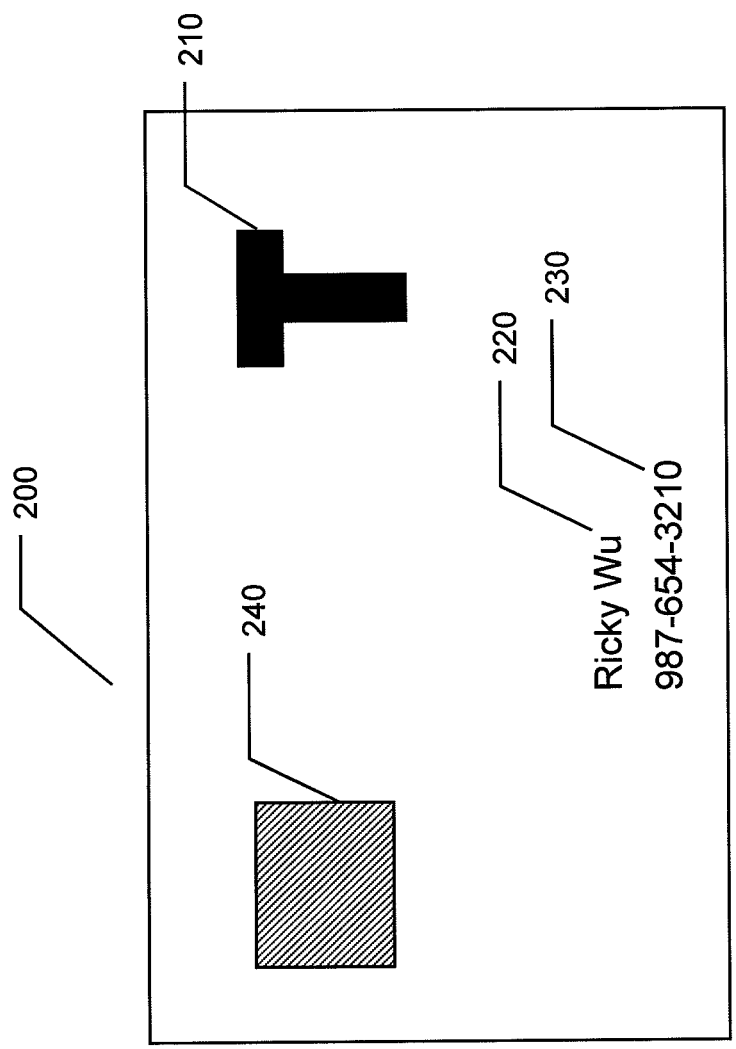

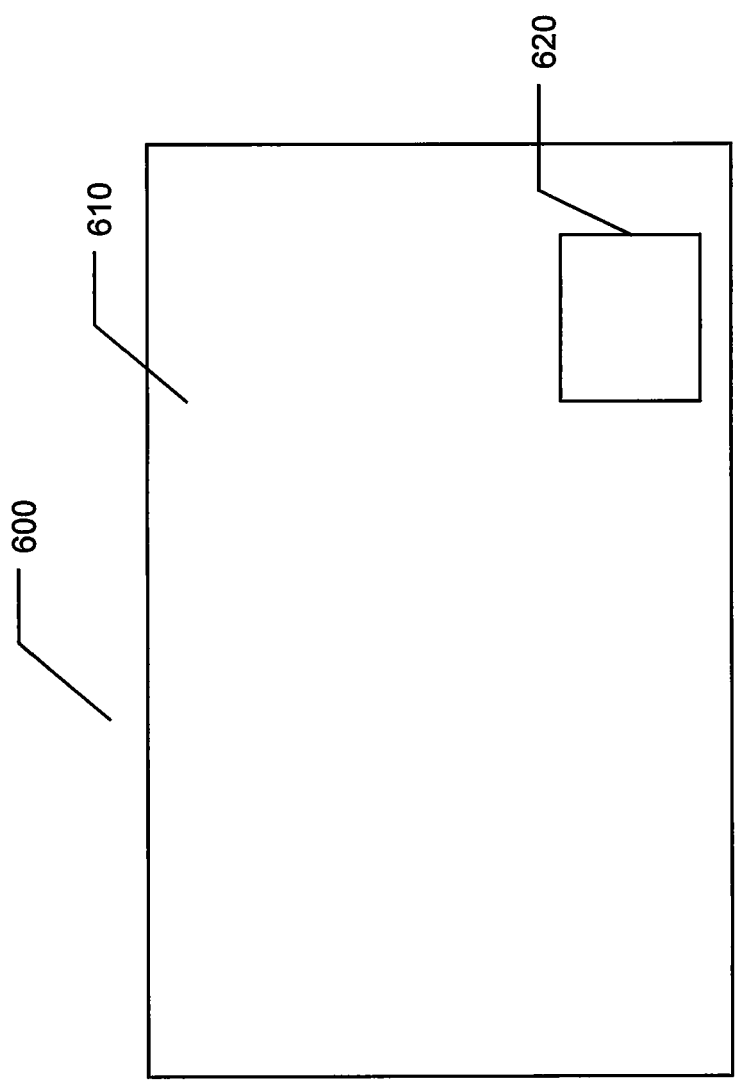

TAMPER-PROOF SECURE CARD WITH STORED BIOMETRIC DATA AND METHOD FOR USING THE SECURE CARD

BACKGROUND OF THE INVENTION

1. Field of the Invention

The present invention relates to identification and payment cards and methods of secure cardholder identity confirmation. More specifically, the present invention discloses a tamper-proof secure card with stored biometric data that cannot be altered or duplicated.

2. Description of the Prior Art

Credit cards are widely used throughout the world to make purchasing products and service convenient. They allow a user to buy items without needing to carry currency.

However, credit card theft and fraud is rapidly becoming a major problem for credit card holders and the issuing financial institutions. If a credit card is stolen, the thief only needs to imitate the credit card holder's signature. This is fairly easy since the signature is prominently displayed on the rear side of the credit card. As a result thieves can easily use the card without the credit card holder's knowledge causing the holder to pay for items they didn't authorize. In some cases the financial institution that issued the card will take responsibility for the payment. However, both of these cases result in losses for either the card holder or the financial institution.

Additionally, thieves can easily duplicate credit cards by reading the cardholder's information that is stored in a magnetic strip on the back of the card and then writing the information onto a blank new card. These duplicate cards can then be used by the thieves or sold to others.

Any purchases made using the stolen cards are billed to the cardholder's account until the cardholder notifies the financial institution that issued the card that the card was lost or stolen.

In cases of duplicate cards, the cardholder won't realize the situation until their bill arrives up to one month later. As a result, the cardholder's account balance can be up to the account's maximum amount.

In both instances either the cardholder or the financial institution that issued the card is responsible for paying for the purchases. This can be devastating for the cardholder or the financial institution.

Refer to FIG. 1A, which is a drawing illustrating a front view of a conventional credit card of the prior art.

As shown in FIG. 1A, the front side of the conventional credit card 100 includes a logo 110 of the financial institution that issued the credit card 100. The card holder's name 120 and account number 130 are embossed in the lower part of the credit card 100.

Refer to FIG. 1B, which is a drawing illustrating a back view of a conventional credit card of the prior art.

The rear side of the conventional credit card 100 includes a magnetic strip 140 that contains account information that the financial institution stored in the magnetic strip 140 before giving the credit card 100 to the customer. A vulnerability of the conventional credit card 100 is that it is possible for thieves to read or copy the data stored in the magnetic strip 140.

Also on the rear side of the conventional credit card 100 is a signature strip 150 where the card holder signs their signature 160. As mentioned above, the conventional credit card 100 provides a thief with an example of the credit card holder's signature 160. This allows the thief to practice imitating the signature until good enough to fool a cashier into accepting the card.

Refer to FIG. 1C, which is a drawing illustrating a conventional network for confirming a credit card of the prior art and to FIG. 1D, which is a flowchart illustrating a conventional method for using a credit card of the prior art.

The conventional method 180 and conventional system 170 for using a credit card include the customer giving the credit card to a cashier and the cashier swipes the credit card 181 through a card swipe machine 171. The card swipe machine 171 reads the account data stored in the magnetic strip on the credit card. The account data is then sent to a central server 173 having an account database 182 over a telephone line 172. The central server 173 then confirms the account has enough funds to cover the purchase 183 and a confirmation notice is sent to the card swipe machine 171, 184.

An invoice is printed 185 and the customer signs the invoice 186. The cashier then looks at the signature on the back of the credit card and compares it to the customer's signature 187. If the cashier feels that the signatures match, a copy of the invoice and a receipt are given to the customer 188. Since the cashier is using personal judgment to verify the signature mistakes are common.

Another disadvantage of the convention card and system is that data is stored on a central server. This opens the door to hackers to break into the server and steal the information. However, in some cases the present invention stores data or information such as account number, customer number, etc. on a central server. However, personal data such as biometric data etc. is not stored on the server.

Therefore, there is need for an improved means of preventing duplication or alteration of a secure card and confirming the identity and authority of an individual and prevents identity theft or misuse.

SUMMARY OF THE INVENTION

To achieve these and other advantages and in order to overcome the disadvantages of the conventional method in accordance with the purpose of the invention as embodied and broadly described herein, the present invention provides a secure card that is tamper-proof to prevent alteration, duplication, and unauthorized use and comprises a cardholder's biometric data that uniquely identifies or confirms authority of the cardholder.

The biometric data comprises, for example, finger vein print, palm vein print, fingerprint, iris or eye, handprint, facial, DNA data, or a combination of these.

Prior to issuing the secure card the card issuer obtains samples of biometric information from the user and stores the biometric data into a memory in or on the card. When the secure card is used, the biometric data stored in the card is compared with biometric data supplied by the user. For example, if the biometric data is a right index fingerprint, the user places their right index finger on a verification machine and the data are compared. In this way, even if the secure card is lost or stolen no one else can use the card since their biometric information will not match the cardholder's biometric information.

The secure card comprises a card number unique to the cardholder. The unique card number is created using the user's biometric data by the card issuing institution. The card number can not be accessed until the input biometric data has been verified to be the cardholder's biometric data.

The method to achieve "tamper-proof" is based on the unique card number which is created and interpreted by using the user's own biometric data, otherwise all processes will fail and the card cannot be altered or modified. For example, without protection of the unique card number a thief could potentially get a blank card then put their biometric data in memory and etching the bio-data pattern on the biometric data section and everything will be their own data and their identity will be verified. However, since the unique card number is created using the intended cardholder's biometric data replacing the biometric data in memory and etching the bio-data pattern onto the card still is not adequate to misuse the card by altering or tampering. Therefore, the present invention truly provides a tamper-proof secure card.

Additionally, the unique card number can be laser etched into or using other method created onto or into the card and used as one part for comparison of bio-data.

Furthermore, the unique card number cannot be extrapolated from or decoded from the biometric data.

In an embodiment of the present invention the secure card is a credit card. When making a purchase the cardholder presents the secure card to the cashier handling the transaction. Biometric data is then supplied by the cardholder by scanning, checking, etc. a particular or combination of particular body features that are unique to the cardholder. The cashier then recalls the biometric data from the secure card by, for example, scanning, swiping, or inserting the card in a card reader or verification machine. The device that reads the biometric data from the secure card or scans the cardholder's biometric data then compares the two data. If the data stored in the card matches the data supplied by the cardholder, the identity is confirmed.

An advantage of the present invention is that while some data or information can be exchanged across a network no personal identification or biometric data is sent across a network. Confirmation is made locally by the verification machine. This prevents identity theft or theft of the cardholder's data.

In another embodiment of the present invention the secure card is an identity card. The cardholder inserts the identity card into a verification machine and supplies their biometric information, for example, a vein print or a fingerprint. The verification machine compares the biometric data stored in the identity card with the biometric data that the cardholder supplies. If the data are the same the verification machine confirms the cardholder's identity.

Another advantage of the present invention is that only the cardholder knows what biometric data to supply. Since there are a wide variety of possible biometric inputs the security is increased. Even if stolen a thief does not know which data to use.

The secure card of the present invention comprises a pattern in the card, conductive traces, or other means to prevent the chip containing the biometric data from being replaced. The chip cannot be removed from the card and replaced with another chip. Any alterations to the card are easily detected. As a result, the card has no use to anyone other than the original cardholder.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings:

FIG. 1A is a drawing illustrating a front view of a conventional credit card of the prior art;

FIG. 1B is a drawing illustrating a back view of a conventional credit card of the prior art;

FIG. 1C is a drawing illustrating a conventional network for confirming a credit card of the prior art;

FIG. 1D is a flowchart illustrating a conventional method for using a credit card of the prior art;

FIG. 2A is a drawing illustrating a front view of a secure card according to an embodiment of the present invention;

FIG. 6A is a drawing illustrating a tamper-proof secure card according to an embodiment of the present invention;

DESCRIPTION OF THE PREFERRED EMBODIMENTS

Figure 2B:
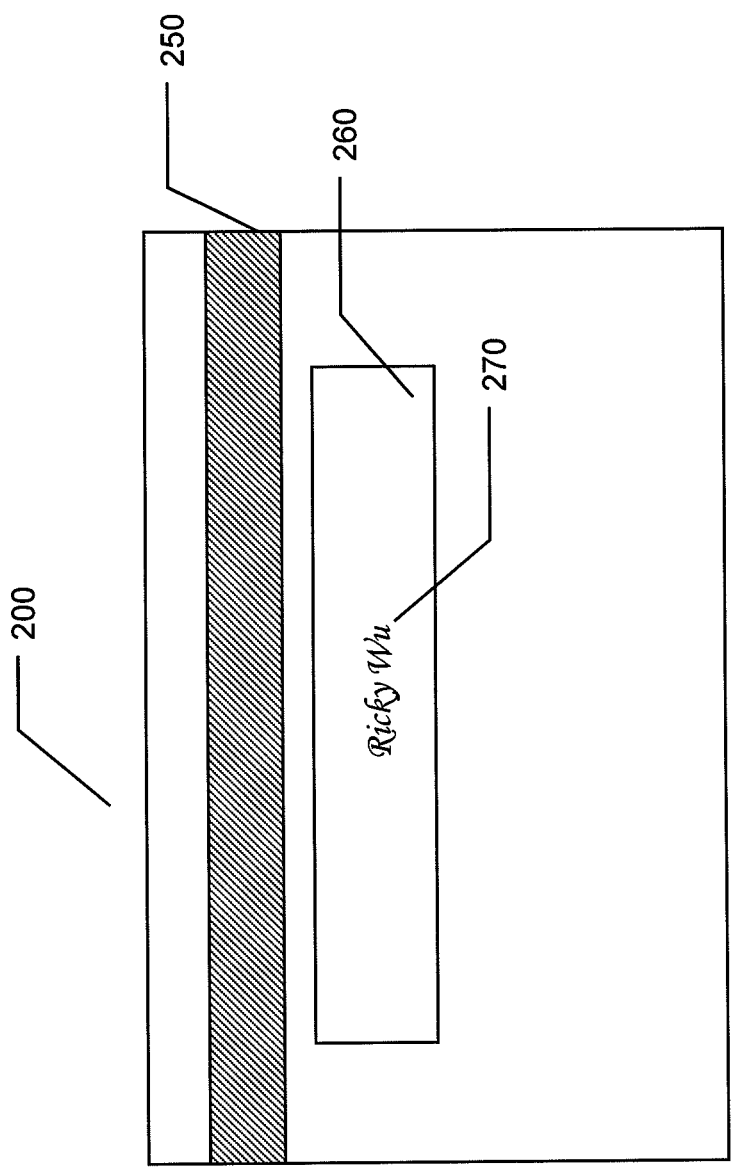
FIGS. 2B-2D are drawings illustrating rear views of a secure card according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

The secure card comprises a card number unique to the cardholder. The unique card number is created using the user's biometric data by the card issuing institution. The card number can not be accessed until the input biometric data has been verified to be the cardholder's biometric data.

The method to achieve "tamper-proof" is based on the unique card number which is created and interpreted by using the user's own biometric data, otherwise all processes will fail and the card cannot be altered or modified. For example, without protection of the unique card number a thief could potentially get a blank card then put their biometric data in memory and etching the bio-data pattern on the biometric data section and everything will be their own data and their identity will be verified. However, since the unique card number is created using the intended cardholder's biometric data replacing the biometric data in memory and etching the bio-data pattern onto the card still is not adequate to misuse the card by altering or tampering. Therefore, the present invention truly provides a tamper-proof secure card.

Additionally, the unique card number can be laser etched into or using other method created onto or into the card and used as one part for comparison of bio-data.

Furthermore, the unique card number cannot be extrapolated from or decoded from the biometric data.

Refer to FIG. 2A, which is a drawing illustrating a front view of a secure card according to an embodiment of the present invention.

In the embodiment illustrated in FIG. 2A the secure card 200 of the present invention comprises a logo 210 or name of the secure card issuer. The logo is, for example, the name of a financial institution or the name of a company. The front side of the secure card 200 also comprises the cardholder's name 220 and account number 230 or user number. A memory chip 240 is attached to or embedded in the secure card 200. When a user applies for the secure card 200 the user supplies certain samples or examples of biometric information. This biometric information uniquely identifies the user as no two individual have the same biometrics. The biometric information is stored in the memory 240 of the secure card 200. When the secure card 200 is used the cardholder supplies or inputs their biometric data and the input is compared with the biometric data stored in the memory 240. If the two match the identity of the cardholder is confirmed.

Refer to FIG. 2B, which is a drawing illustrating a rear view of a secure card according to an embodiment of the present invention.

In an embodiment of the present invention as shown in FIG. 2B the back side of the secure card 200 comprises a magnetic strip 250 and a signature area 260. Information is stored in the magnetic strip 250. This information is read when the secure card is used. The signature area 260 allows a user to sign their name 270.

The cardholder information comprising account information, account number, personal identification number, employee number, security level, rank, financial institution identification, card number, card issuer identification, company name, or a combination of these.

Figure 2C:
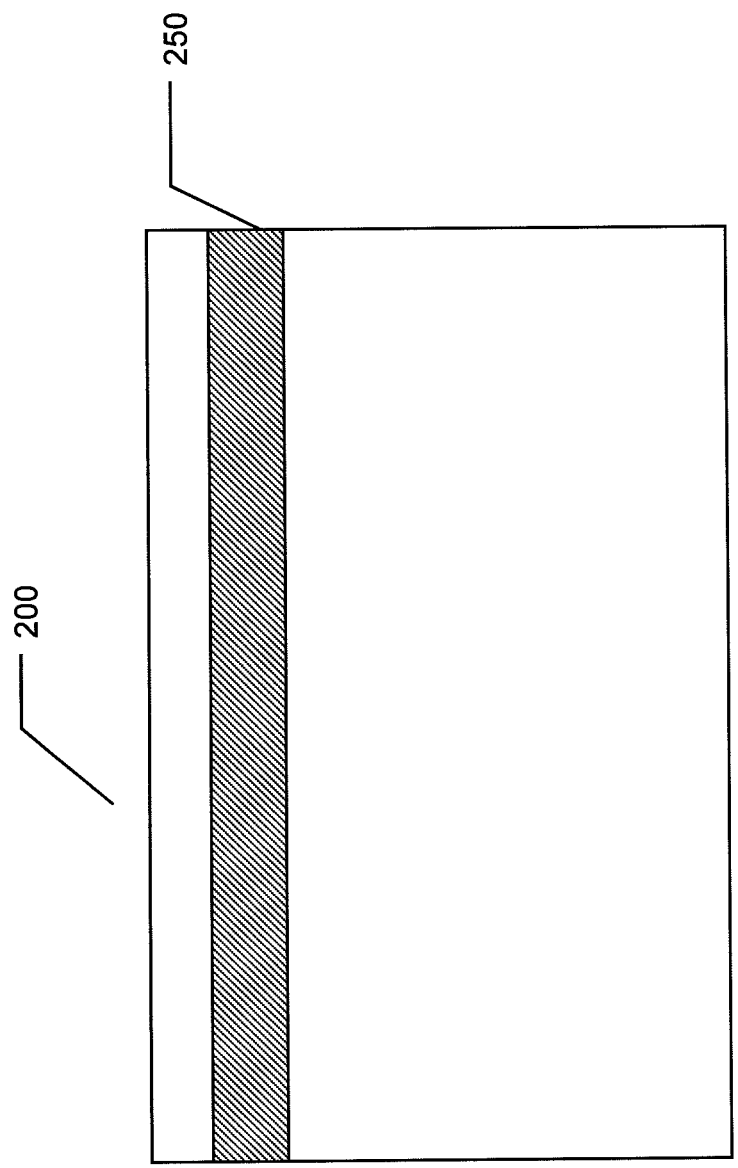

Refer to FIG. 2C, which is a drawing illustrating a rear view of a secure card according to an embodiment of the present invention.

In another embodiment, the signature area isn't present. This increases security as the cardholder's signature isn't visible. In this embodiment when the secure card is used the signature of the cardholder is compared with signature data in the memory of the secure card. This process is considerably more accurate that relying on a cashier to visually compare the signatures. In this embodiment the biometric input and the biometric data stored in the card are compared first. If verified both are the same, then the signature stored in the card is compared to signature provided by the cardholder. All data to be read from the card should only be accessed after confirmation of the biometric data to prevent comparison of the stored signature and copying of the signature. In this way, a thief cannot copy the stored signature.

In another embodiment where the signature area isn't present, when the secure card is used no signature is required. Since biometrics are far more complex and impossible to duplicate, comparing the biometric data in the card memory with a user's supplied biometric data provides sufficient security.

Figure 2D:
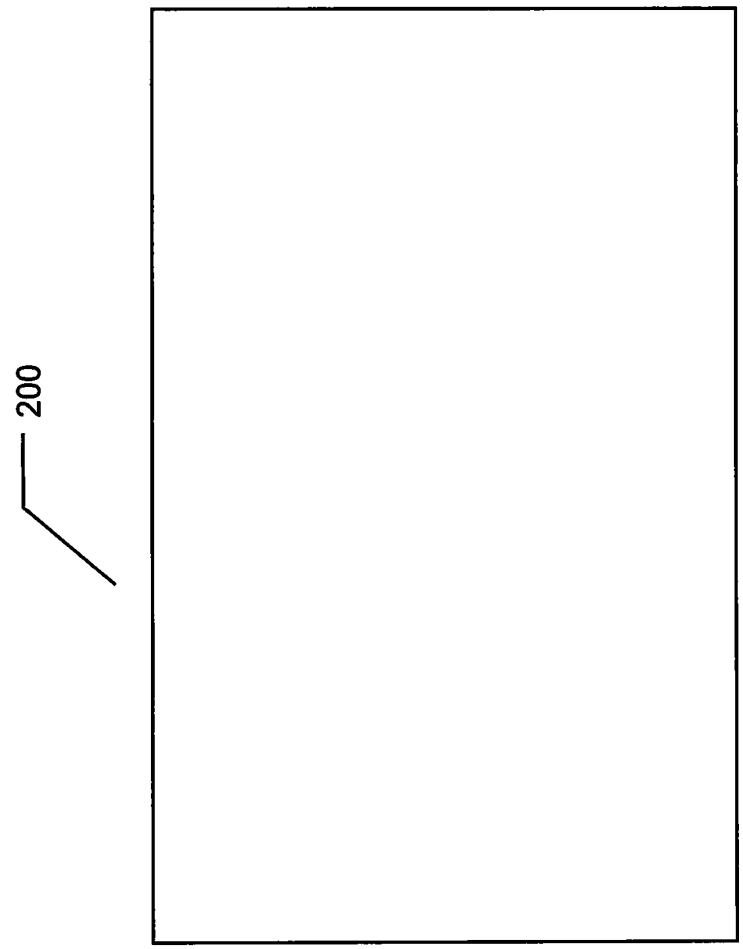

Refer to FIG. 2D, which is a drawing illustrating a rear view of a secure card according to an embodiment of the present invention.

In the embodiment illustrated in FIG. 2D, both the magnetic strip and the signature area are not present. In this embodiment the information that would normally be stored in the magnetic strip is stored in the secure card's memory along with the biometric data. This further increases security for the information as the information cannot be read without confirmation of the biometric data. In contrast, information stored in a magnetic strip can be read by a card swipe machine without requiring input by a cardholder.

Figure 2E:
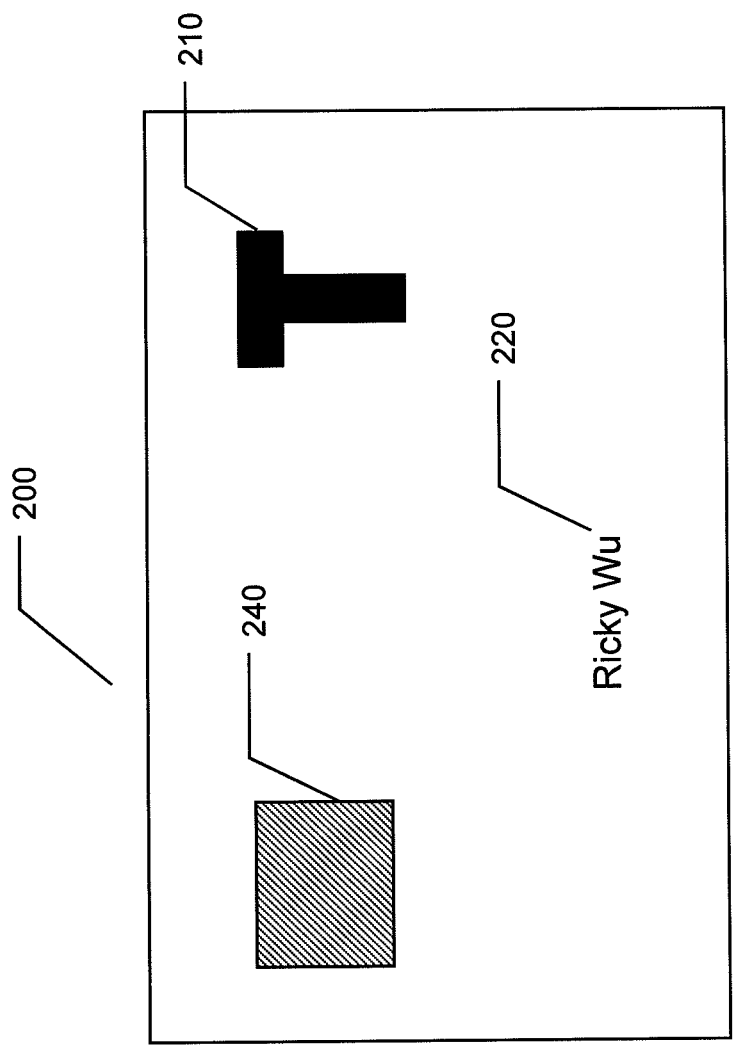
FIGS. 2E-2F are drawings illustrating front views of a secure card according to an embodiment of the present invention.

Refer to FIG. 2E, which is a drawing illustrating a front view of a secure card according to an embodiment of the present invention.

In another embodiment of the present invention the front side of the secure card 200 comprises the logo 210, the cardholder's name 220, and the memory 240 with the cardholder's stored biometric data. In this embodiment the secure card 200 doesn't display the cardholder's account number or identification number.

Figure 2F:
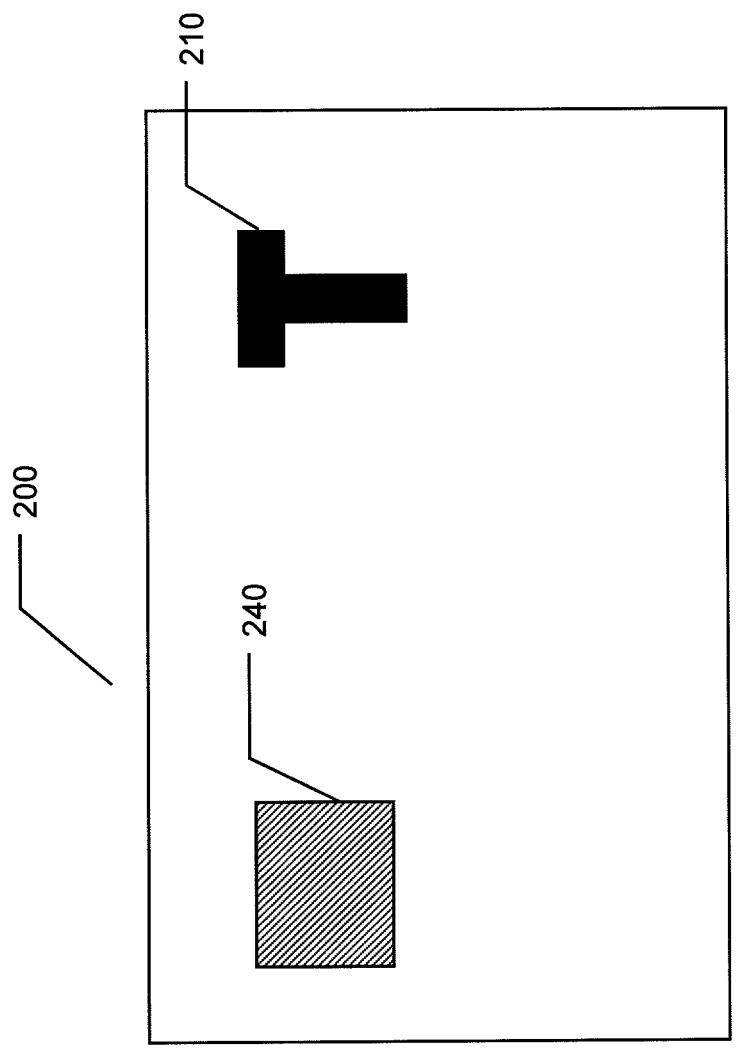

Refer to FIG. 2F, which is a drawing illustrating a front view of a secure card according to an embodiment of the present invention.

In the embodiment illustrated in FIG. 2F, the cardholder's name and account number are not displayed on the secure card 200. This further increases security as no one else but the cardholder knows who the secure card belongs to. Cardholder's name and account data cannot be accessed until the stored biometric data and the input biometric data have been verified to match.

Figure 2G:
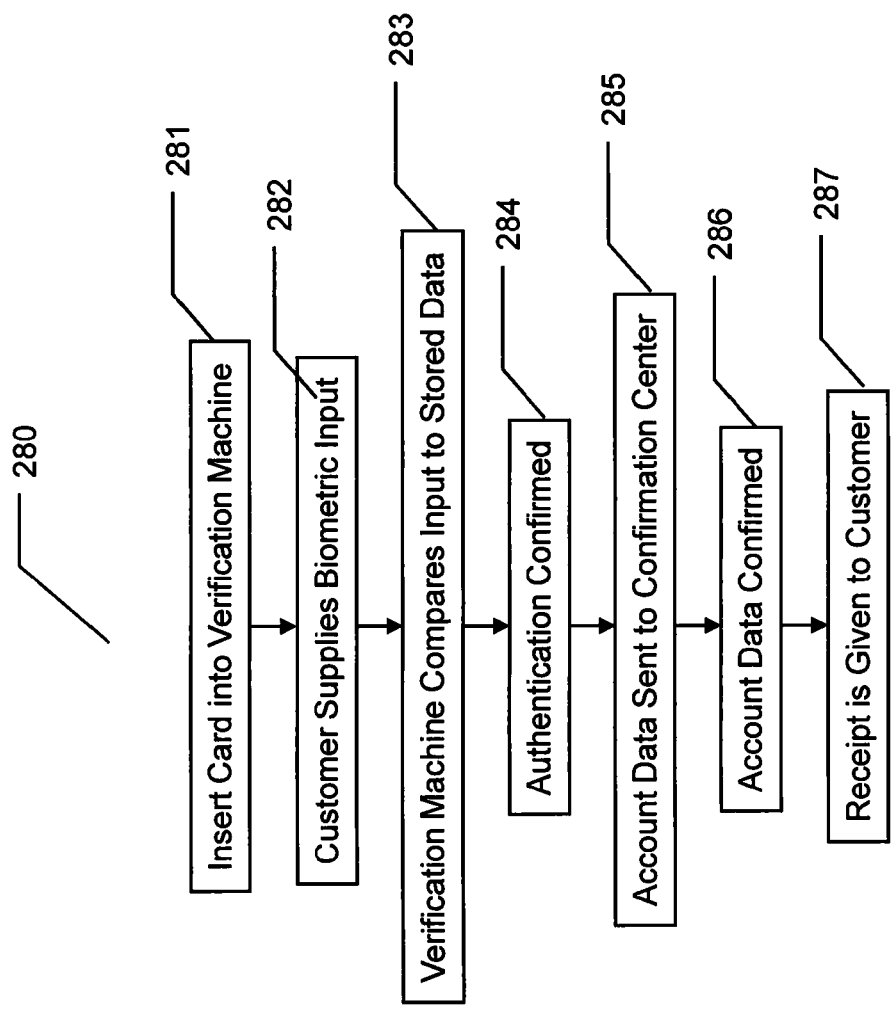
FIGS. 2G-2H are flowcharts illustrating methods of using a secure card according to an embodiment of the present invention.

Refer to FIG. 2G, which is a flowchart illustrating a method of using a secure card according to an embodiment of the present invention.

As shown in FIG. 2G, a method of using a secure card 280 comprises inserting the secure card into a verification machine in Step 281. The cardholder then supplies their biometric input in Step 282. In Step 283 the verification machine compares the biometric input with biometric data stored in the secure card. If the data matches, the verification machine confirms the cardholder's identity in Step 184. Once the cardholder's identity is verified, account information is sent to an account confirmation center in Step 285 and the confirmation center determines if there are adequate funds in the account. The confirmation center sends a confirmation to the verification machine in Step 286 and a receipt is given to the cardholder in Step 287.

In this embodiment the cardholder's account information is not sent until the cardholder's identity has been confirmed. This provides superior security over the conventional method where the account information is sent to the central server before the user's identity is confirmed by their signature.

Figure 2H:
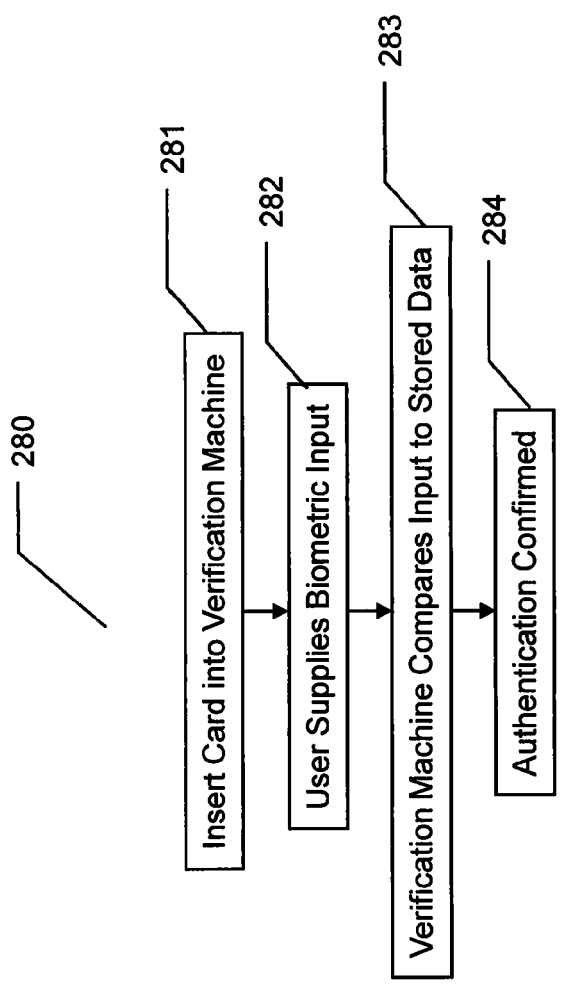

Refer to FIG. 2H, which is a flowchart illustrating a method of using a secure card according to an embodiment of the present invention.

As shown in FIG. 2H, a method of using a secure card 280 comprises inserting the secure card into a verification machine in Step 281. The cardholder then supplies their biometric input in Step 282. In Step 283 the verification machine compares the biometric input with biometric data stored in the secure card. If the data matches, the verification machine confirms the cardholder's identity in Step 184. In this embodiment no information is sent across a network and the verification procedure is performed locally by the verification machine. This provides optimal security for the cardholder. Since none of the cardholder's data is stored on a network or server the cardholder's data cannot be stolen or misused.

Figure 2I:
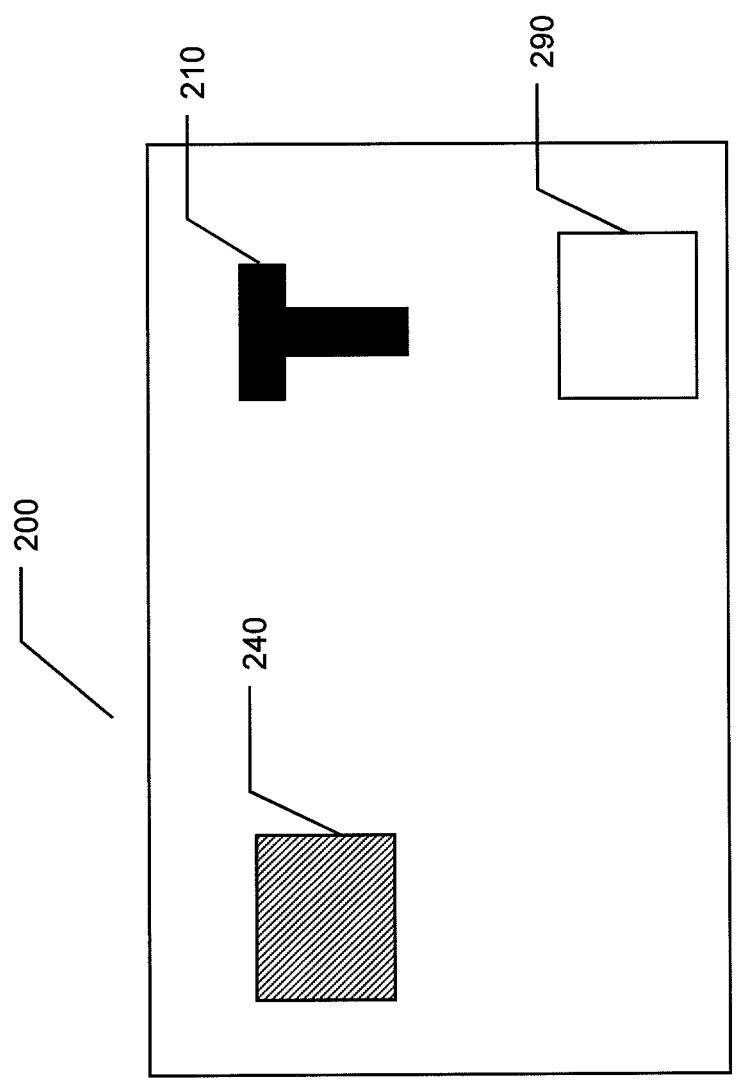
FIGS. 2I-2J are drawings illustrating front views of a secure card according to an embodiment of the present invention.

Refer to FIG. 2I, which is a drawing illustrating a front view of a secure card according to an embodiment of the present invention.

In the embodiment illustrated in FIG. 2I, the secure card 200 comprises a logo 210, a memory 240, and a transparent input area 290 where a cardholder inputs their biometric data. For example, after the secure card is inserted into the verification machine the cardholder presses a finger onto the transparent input area 290. The verification machine scans the fingerprint and compares it to fingerprint data stored in the memory 240 of the secure card 200.

In this embodiment since the finger doesn't contact the verification machine directly, the fingerprint cannot be transferred. For example, if the surface of the verification machine is glass and the cardholder presses their finger to the glass for scanning it is possible that a residual fingerprint is left on the glass. Although difficult it is possible for a thief to obtain a copy of the fingerprint from the glass. However, in this embodiment the cardholder presses their fingerprint to the transparent input area 290 which is between the cardholder's finger and the surface of the verification machine. If the fingerprint is transferred it is left on the transparent input area 290 and not the verification machine. The transparent input area 290 can easily be wiped clean to remove traces of the fingerprint.

Figure 2J:
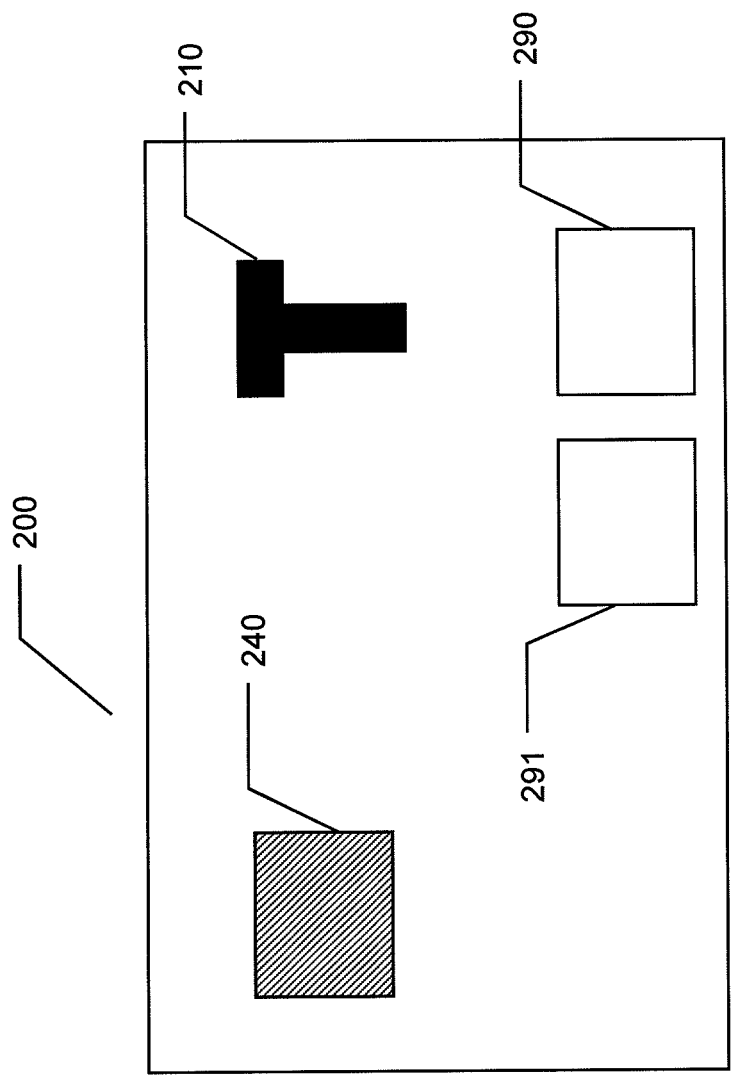

Refer to FIG. 2J, which is a drawing illustrating a front view of a secure card according to an embodiment of the present invention.

In embodiments of the present invention the secure card 200 comprises a plurality of transparent input areas. In the embodiment illustrated in FIG. 2J, the secure card 200 comprises a first transparent input area 290 and a second transparent input are 291. This allows two pieces of biometric data to be input at a time. Since a plurality of separate biometric inputs is required, security is increased. In other embodiments of the present invention the secure card comprises more than two transparent input areas. For example, the secure card comprises four transparent input areas so that the four fingerprints of one hand are input at the same time or eight transparent input areas so that the four fingerprints of both hands are input at the same time.

Figure 2K:
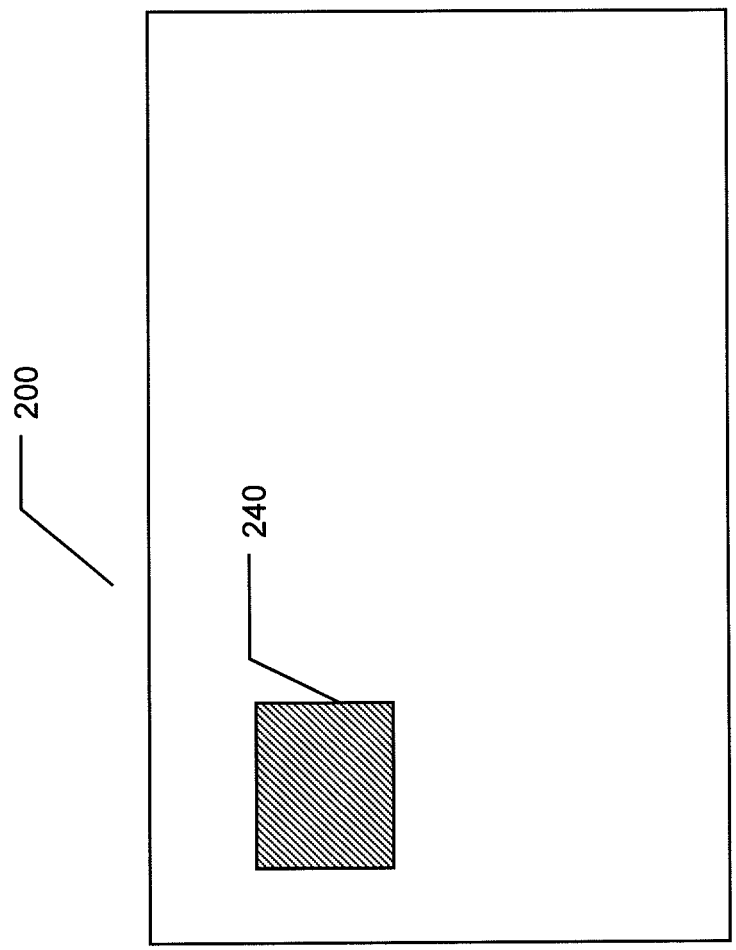
FIG. 2K is a drawing illustrating a front view of a secure card according to an embodiment of the present invention.

Refer to FIG. 2K, which is a drawing illustrating a front view of a secure card according to an embodiment of the present invention.

In this embodiment no information is displayed on the secure card 200. The secure card 200 only comprises a memory 240 in which the cardholder's biometric data is stored. This embodiment provides ultimate security since the cardholder's signature, name, account number are not shown on the card. If the card is stolen the thief doesn't know who the card belongs to so the card is useless to the thief. Additionally, the logo of the card issuer or company is not displayed so no one knows how the card can be used. Since no information is visible on the card no one knows how or where the secure card can be used except the cardholder.

In an embodiment of the present invention a personal identification number or password is stored in the secure card's memory. Along with biometric data the cardholder inputs an identification number or password in order to complete the confirmation process.

Figure 3:
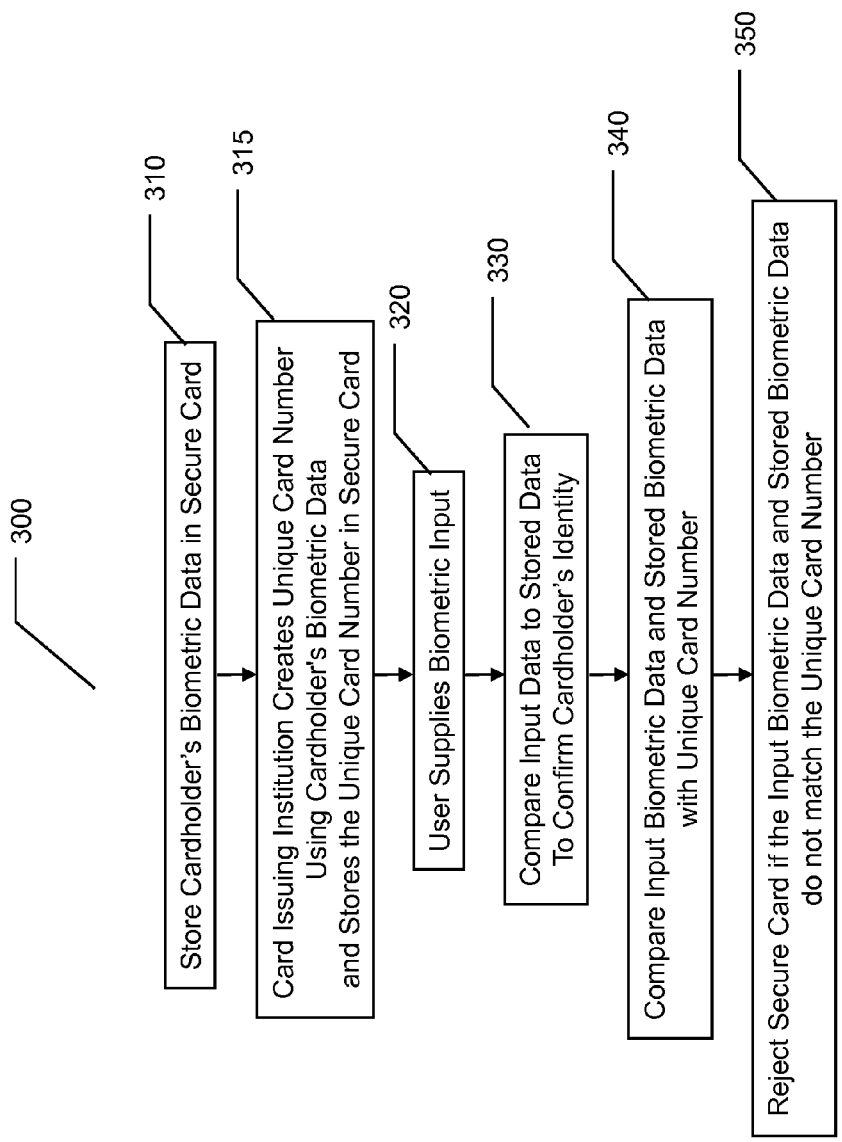
FIGS. 3, 4A-4G, and 5A-5B are flowcharts illustrating methods of using a secure credit card according to embodiments of the present invention.

Refer to FIG. 3, which is a flowchart illustrating a method for using a secure card to identify a cardholder according to an embodiment of the present invention.

The method 300 begins by storing biometric data of a cardholder in a secure card in Step 310. Next, in Step 315 the card issuing institution creates a unique card number using the intended cardholder's biometric data and stores the unique card number in the secure card prior to issuing the secure card to the cardholder. Next in Step 320, when the card is used biometric data is input by the cardholder and the input biometric data is compared with the stored biometric data to confirm the identity of the cardholder in Step 330. If the data match the cardholder's identity is confirmed. Next, in Step 340 the input biometric data and the stored biometric data are compared with the unique card number. If the input biometric data and the stored biometric data do not match the unique card number the secure card is rejected in Step 350.

Figure 4A:
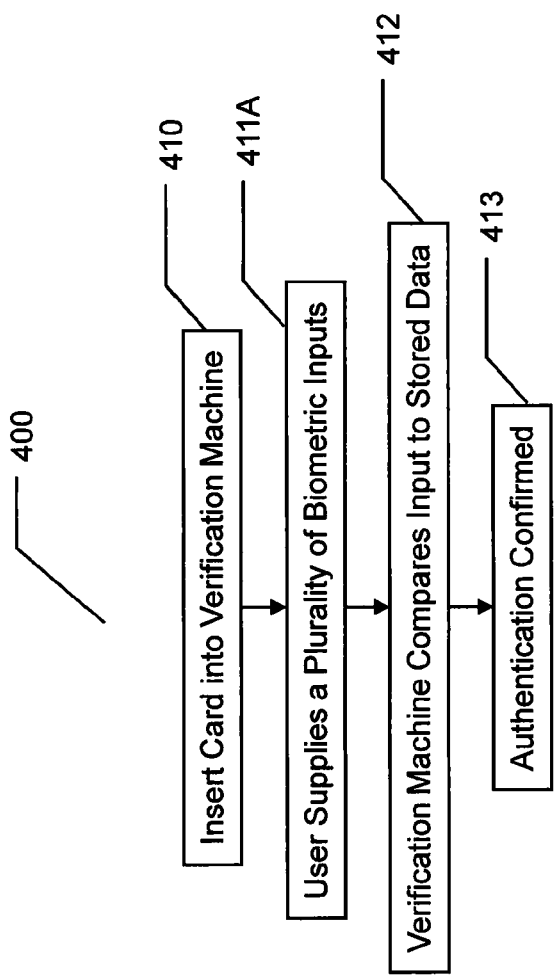

Refer to FIG. 4A, which is a flowchart illustrating a method for using a secure card according to an embodiment of the present invention.

The method 400 begins by a secure card user inserting the secure card into or placing the card on a verification machine in Step 410. In Step 411A the user supplies or inputs a plurality of biometric inputs. For example the user places the right index finger into or on a vein print reader. After the reader scans the vein print of the right index finger the user places, for example, the left thumb into or on the vein print reader. The verification machine compares the input biometric data, in this example the right index finger and left thumb vein print with the biometric data stored in the secure card in Step 412. If the input biometric data matches the stored biometric data the user's identity is confirmed or validated in Step 413 and the appropriate action or procedure is performed. For example, if the secure card is used to open a door, the door is unlocked and the validated user can enter. Or for example, if the secure card is used with an automatic teller machine (ATM) the confirmed user can proceed with accessing their account.

In an embodiment of the present invention the plurality of biometric inputs is different. For example, a palm vein print and a fingerprint are input. This allows the user to create a unique code as the sequence and input type are only known to the user. This provides high security for the user and the secure card provider. For example, the left palm vein print is the first input and the right thumbprint is the second input and the left index fingerprint is the third input selected by the user and stored in the secure card if any of these inputs are out of order or the input is not correct or the input doesn't match the stored biometric data the secure card is rejected and the user cannot proceed.

Figure 4B:
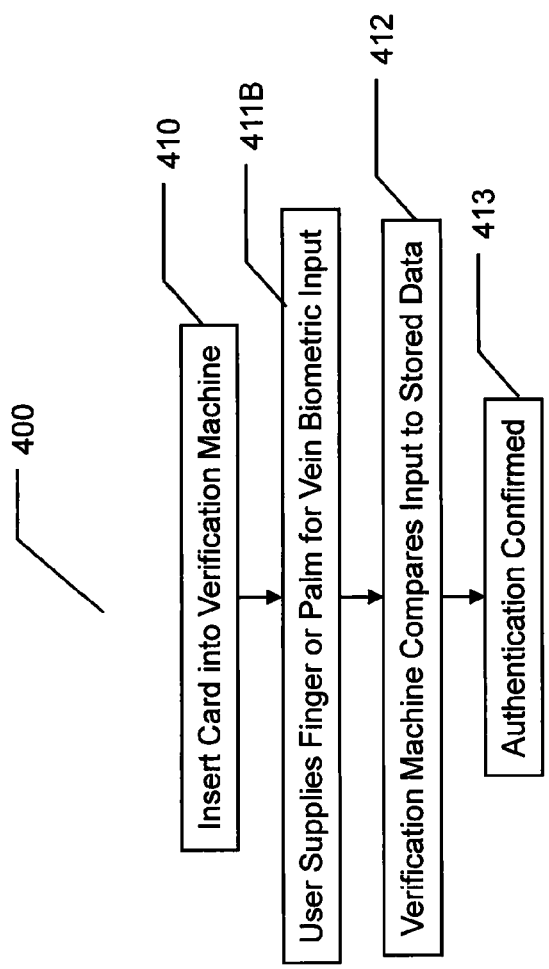

Refer to FIG. 4B, which is a flowchart illustrating a method for using a secure card according to an embodiment of the present invention.

The method 400 begins by a secure card user inserting the secure card into or placing the card on a verification machine in Step 410. Next the user supplies a finger or palm for vein print scanning in Step 411B. The verification machine compares the input vein print with the biometric data stored in the secure card in Step 412. If the input biometric data matches the stored biometric data the user's identity is confirmed or validated in Step 413 and the appropriate action or procedure is performed.

Figure 4C:
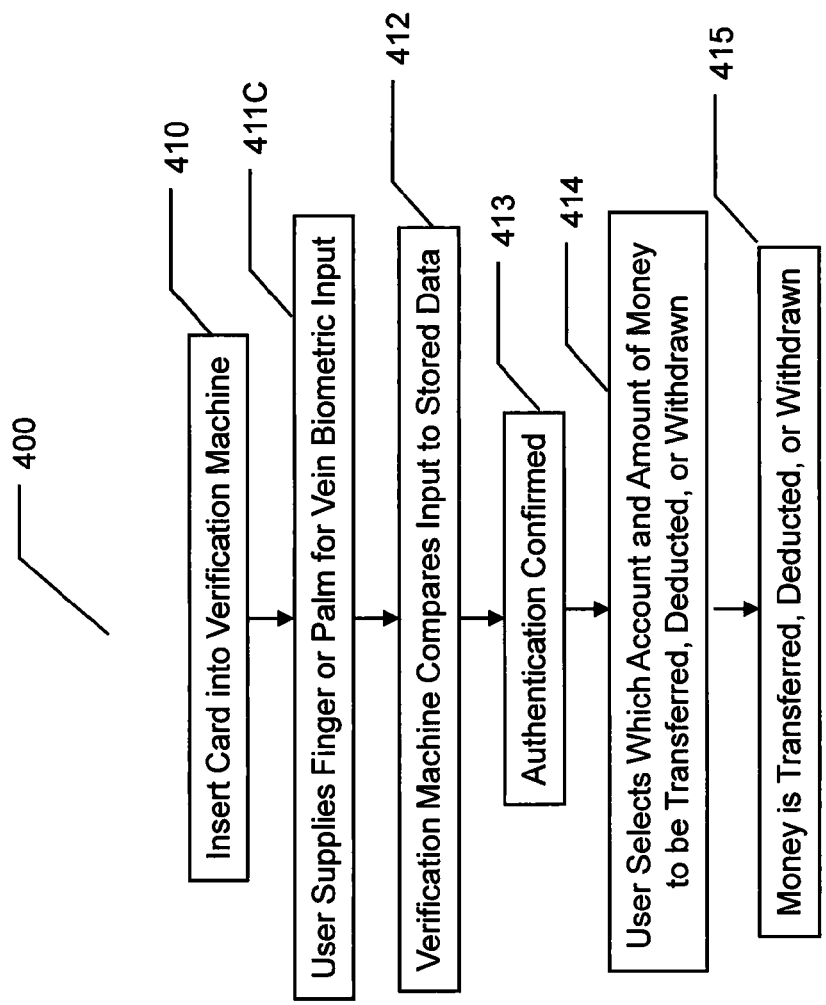

Refer to FIG. 4C, which is a flowchart illustrating a method for using a secure card according to an embodiment of the present invention.

The method 400 begins by a secure card user inserting the secure card into or placing the card on a verification machine in Step 410. Next the user supplies a finger or palm for vein print scanning in Step 411C. The verification machine compares the input vein print with the biometric data stored in the secure card in Step 412. If the input biometric data doesn't match the stored biometric data the card is rejected. If the input biometric data matches the stored biometric data the user's identity is confirmed or validated in Step 413. In Step 414 the authenticated user selects which bank account to access and the amount of money to be transferred, deducted, or withdrawn. For example, the secure card is utilized as an ATM card or credit card. When making a purchase the authenticated user can make an electronic transfer of funds to the retail store. Since only the authenticated user can access the account the secure card of the present invention provides higher security than a conventional credit or debit card. In Step 415 the money is transferred, deducted, or withdrawn.

Figure 4D:
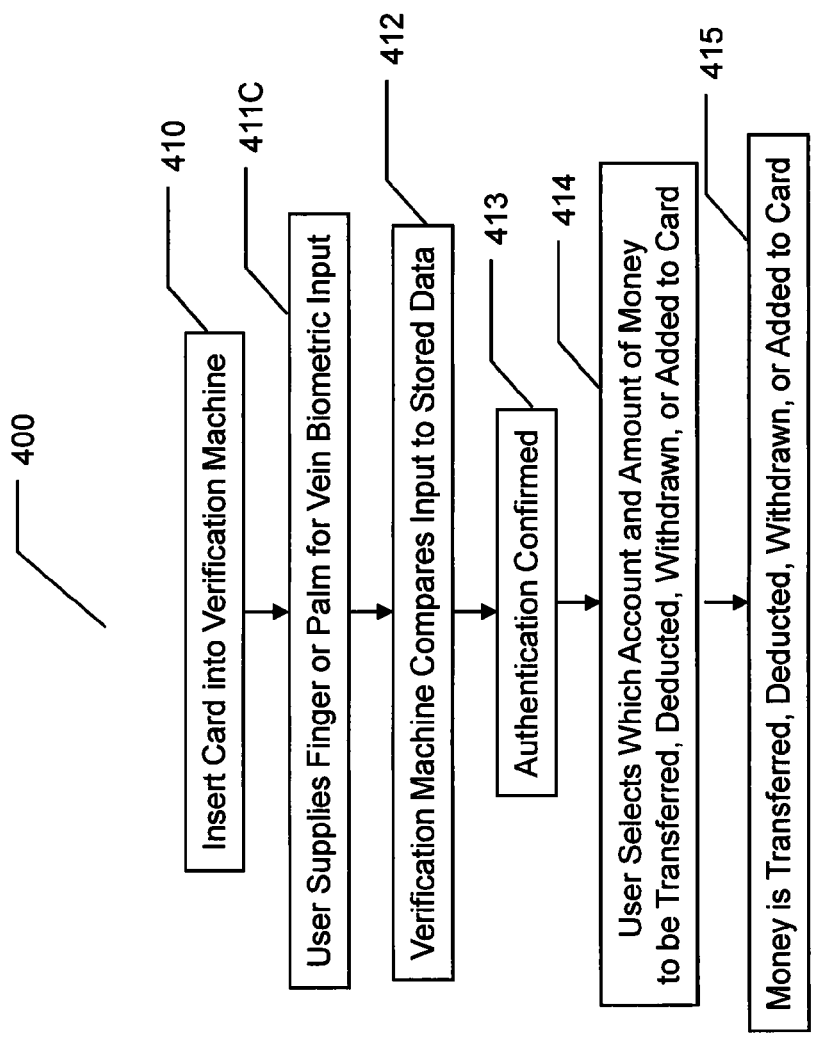

Refer to FIG. 4D, which is a flowchart illustrating a method for using a secure card according to an embodiment of the present invention.

The method 400 illustrated in FIG. 4D is similar to the embodiment in FIG. 4C. However, in this embodiment the secure card is applied to a debit card or electronic money card. Once a user has been authenticated they are able to transfer money to, deduct money from, withdraw money from, or add money to the secure card.

In an embodiment of the present invention the secure card has a plurality of uses. For example, a single secure card can be used as a credit card, debit card, door entry card, and a driver's license. This provides a more flexible and convenient situation for the user. Additionally, multiple bank accounts or accounts at different banks can be accessed from a single card.

In an embodiment of the present invention if one single card accesses multiple banks, there is some data stored in these banks and the card acts like a key which can open many doors, but before each of the doors open, bio-confirmation is needed for the bank. In an embodiment data correctness is confirmed and endorsed by a bank employee such as a supervisor, or by dual bio-confirmation once the door open. For example, the cardholder and the supervisor open the door together by the confirmation. This prevents hackers from accessing the bank account. Additionally, an ATM only sends a unique account number created when the biometric data and the confirmation of biometric data have been matched after which the door is opened securely and the cardholder can proceed with the remaining procedures.

Figure 4E:
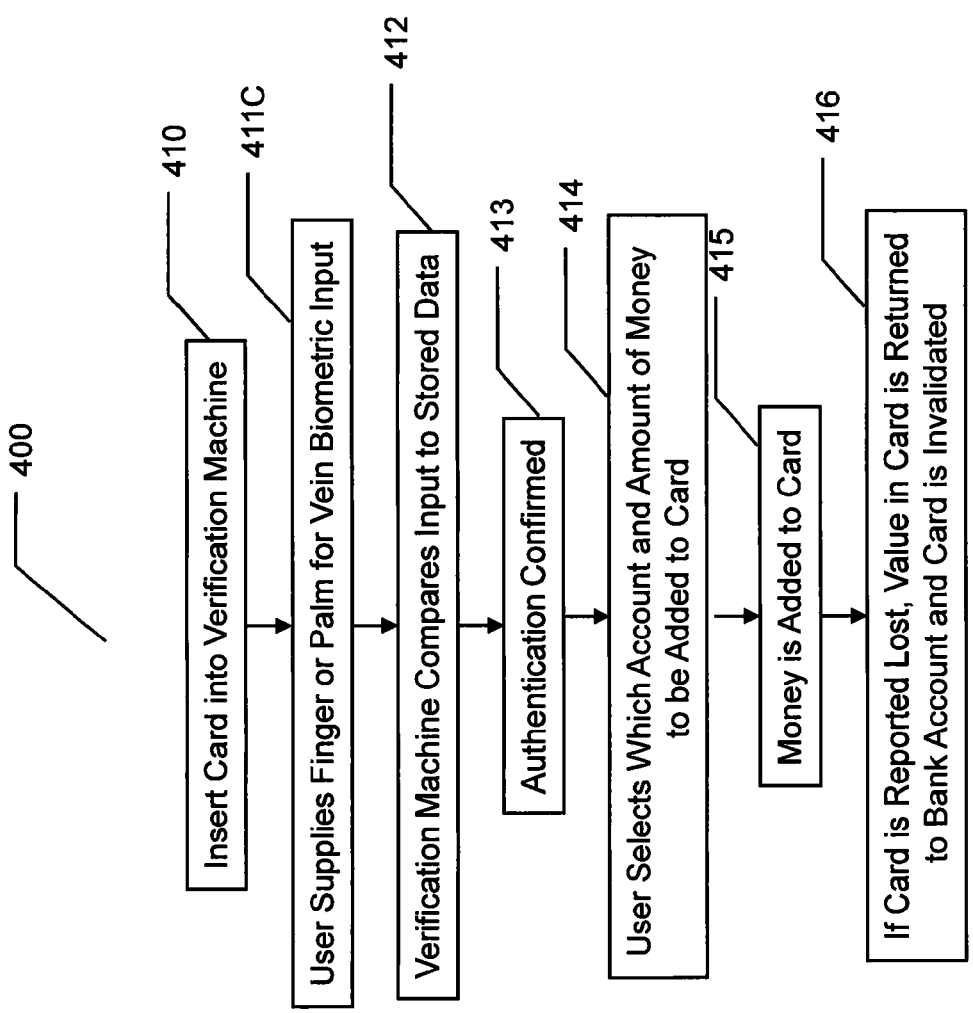

Refer to FIG. 4E, which is a flowchart illustrating a method for using a secure card according to an embodiment of the present invention.

The method 400 illustrated in FIG. 4E is similar to the embodiment in FIG. 4D. However, in this embodiment if the secure card is reported stolen or lost the value in the card is returned to the original bank account and the card is invalidated in Step 416. Unlike conventional debit cards the user retains the money that was stored in the card.

In an embodiment of the present invention the bank or financial institution maintains a transaction record for the secure card. When the card is used to make a purchase the bank is notified of the amount deducted from the card and the card balance. In this way, if the card is lost the remaining balance in the card is returned to the user's bank account and the card is invalided thereby canceling the remaining balance in the card.

In an embodiment of the present invention a transaction server maintains the transaction record for a plurality of accounts. For example, a user has three accounts with three different banks. Different amounts of money can be transferred to the secure card and if reported lost or stolen the transaction server will return the correct amount to the proper account at each bank.

Figure 4F:
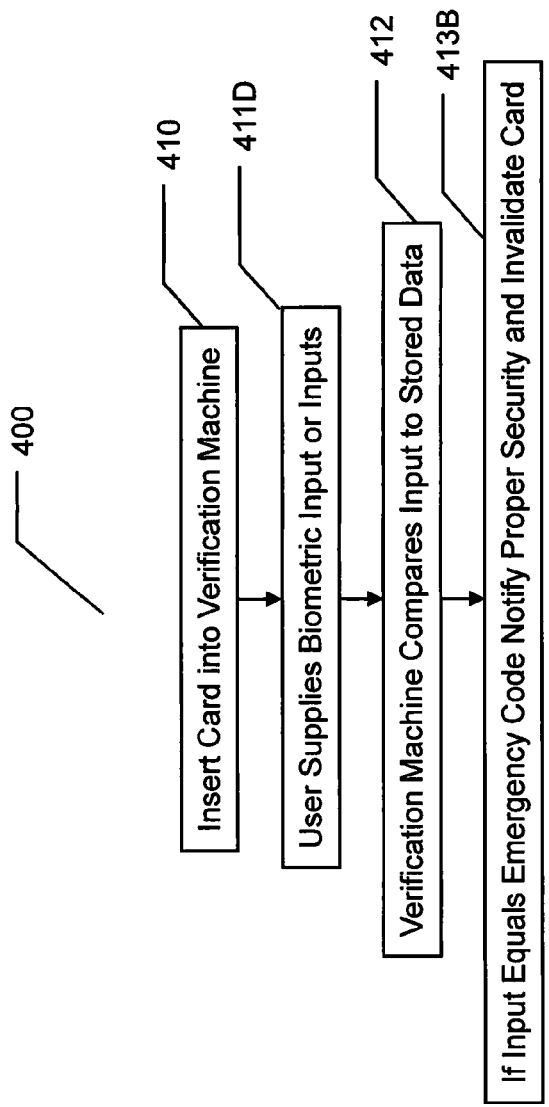

Refer to FIG. 4F, which is a flowchart illustrating a method for using a secure card according to an embodiment of the present invention.

The method 400 begins by a secure card user inserting the secure card into or placing the card on a verification machine in Step 410. In Step 411D the user supplies or inputs a biometric input or a plurality of biometric inputs. In Step 412 the verification machine compares the input biometric data with the biometric data stored in the secure card. If the input data equals an emergency code stored in the secure card appropriate security or authorities are notified and the card is invalidated in Step 413B. For example, the user has stored in the card the sequence of right index vein print, left thumbprint, and right palm vein print as the correct biometric combination and sequence. In an emergency situation such as a robbery a user can input other data combination or sequence and the police can be notified that a robbery is in progress.

Figure 4G:
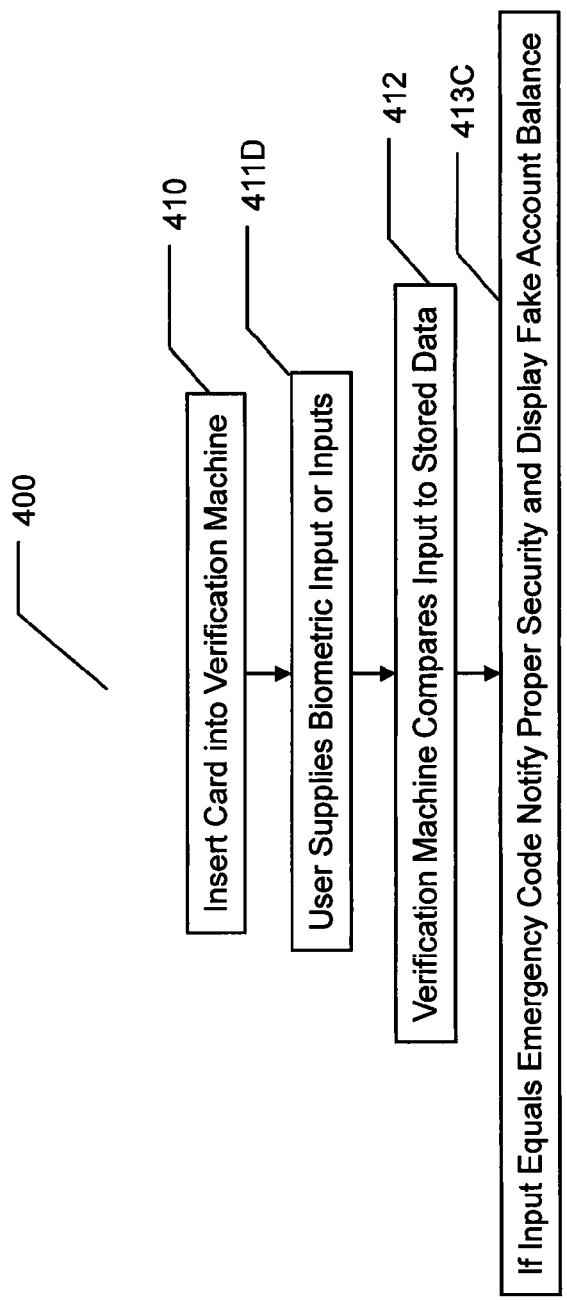

Refer to FIG. 4G, which is a flowchart illustrating a method for using a secure card according to an embodiment of the present invention.

The method 400 illustrated in FIG. 4G is similar to the embodiment in FIG. 4F. However, in this embodiment the secure card is applied to an ATM card, debit card, or credit card. In Step 413C if the input biometric data matches an emergency code stored in the secure card the proper authorities or security are notified and a fake account balance is displayed. For example, the user currently has $10,000 in their account and the user is threatened at gunpoint to access their account. With a conventional ATM card the user is faced with exposing the current account balance and risking losing it all by accessing the account or faced with bodily harm if refusing to access the account. However, with the present invention the user can access the account with the emergency code combination and sequence and an artificial account balance will be displayed. For example, instead of displaying the correct balance of $10,000 the ATM will display an arbitrary or pre-selected amount such as $32.86. As a result, the user can safely access the account and withdraw up to $32.86 without risking personal injury as the robber can see that there is only this amount in the account.

Figure 5A:
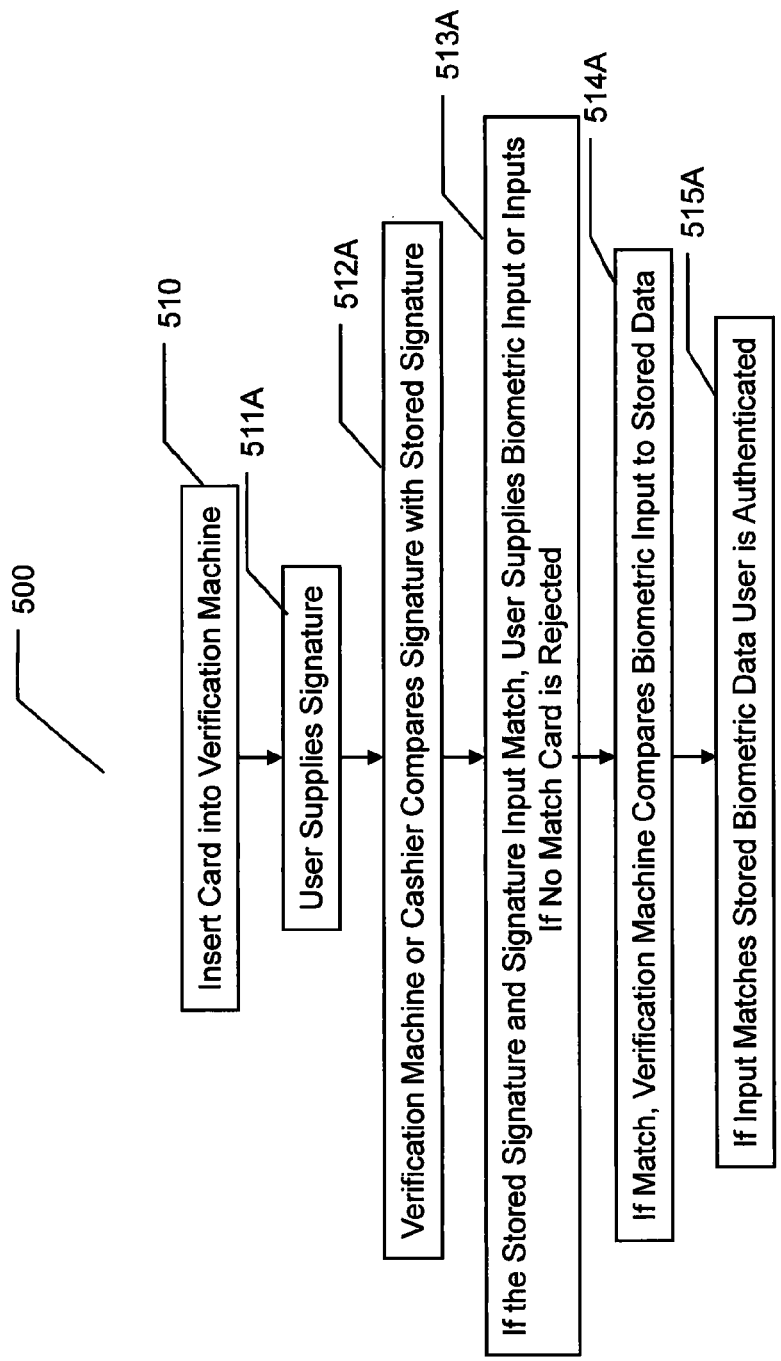

Refer to FIG. 5A, which is a flowchart illustrating a method for using a secure card according to an embodiment of the present invention.

In the method 500 illustrated in FIG. 5A the user supplies a signature in Step 511A. In Step 512A the verification machine or the cashier compares the input signature with the signature stored in the secure card. If the stored signature and the input signature don't match the card is rejected and if they match the user supplies a biometric input or inputs in Step 513A. As described previously data only comes out from the memory after the confirmation of bio-data, for example, since you can compare the signatures before bio-confirmation, you can see the signature before you sign by swiping the card with another reader first, and then copy the writing. By confirmation the biometric data first and then comparing the signature no one besides the authorized cardholder can use the card.

In Step 514A the verification machine compares the input biometric data with the stored biometric data. If the input matches the stored data the user is authenticated or verified in Step 515A. If the two sets of data don't match the card is rejected.

In this embodiment the user must supply a signature before supplying biometric data. This embodiment provides increased security since the stored biometric data cannot be read from the card until a correct signature is provided. One hazard to storing any information or data in a card is that in order to confirm that the input matches the stored data the stored data has to be retrieved. However, in this embodiment vital data is not read or accessed until the biometric input and biometric stored data are confirmed and then that the signature has been confirmed.

Figure 5B:
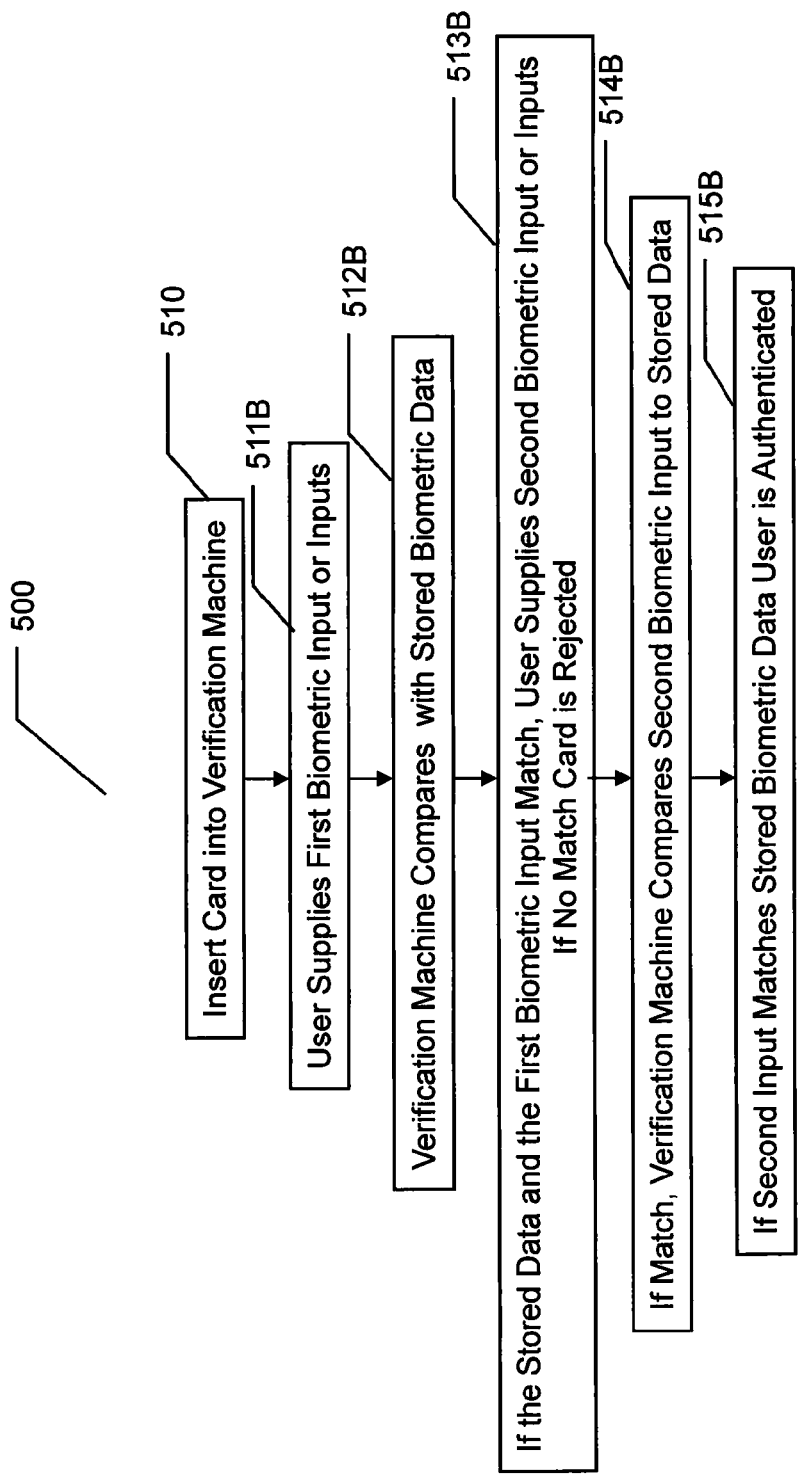

Refer to FIG. 5B, which is a flowchart illustrating a method for using a secure card according to an embodiment of the present invention.

The method 500 illustrated in FIG. 5B is similar to the embodiment in FIG. 5A. However, in this embodiment of the present invention the biometric data a plurality of levels of input are needed before or after biometric confirmation and then important data can be read from the card. For example, the user inputs a password or personal identification number in Step 511B and if correct the user inputs a second data such as a right index vein print in Step 513B. If this matches the stored data in Step 514B the user then enters another biometric data such as a left palm vein print. If this matches the stored data the user is then allowed to access or perform an activity in Step 515B.

In an embodiment of the present invention the user automatically supplies information. For example, the user's weight is measured by a scale when the user attempts to use the secure card. Other information can be obtained such as height, body temp, heart rate, pulse, retina scan, shoe size etc. This further increases security. For example, during a robbery a robber is standing right behind or next to the user. Since the combined weight of the user and the robber is substantially greater than the user's weight the appropriate procedure is performed when the stored user's weight doesn't match the current situation.

Also by detecting the weight of individuals within an area only one individual is allowed to enter a facility at a time. For example, in a high secure facility several individuals are prevented from entering at the same time using a single secure card.

In an embodiment of the present invention the input data further comprises tempo or rhythm. For example, the stored data is selected according to the tempo of a song or phrase. When the user supplies the biometric data, key code sequence, or password the data must be input at the correct tempo or rhythm. In this embodiment, in order to use the secure card the user must supply the correct input in the correct sequence and at the correct tempo or rhythm.

In an embodiment of the present invention the verification machine further comprises a flat touch screen for input. In this embodiment the user inputs a drawing, shape, shape sequence, letters, signature, word, color, or combination of these. For example, the user can select a blue circle followed by a yellow triangle and the word "textbook" as the correct sequence and combination to use the secure card.

In some embodiments of the present invention a plurality of biometric inputs is required. For example, a fingerprint and iris are scanned and compared with biometric data stored in the card.

In another embodiment of the present invention biometric data are input sequentially. For example, first a right hand index fingerprint is input, then a left middle fingerprint, and then a right thumbprint. In this embodiment the sequence of the inputs increases the complexity required to try to misuse the secure card. Only the cardholder knows which sequence to follow.

In embodiments of the present invention the secure card comprises a credit card, identification card, a driver's license, an entrance keycard, an employee badge, a passport, a medical insurance card, an automatic teller machine card, a bank card, a debit card, a transit card, a public transportation card, a national identification card, a membership card, or a key of a safe or locker.

As described above, the present invention provides a secure card with a cardholder's biometric data. When the secure card is used the cardholder provides a biometric input. This input is then compared with the data stored in the secure card. If they match, the cardholder's identity is confirmed. In this way, only the cardholder can use the secure card. Even if the card is stolen, a thief is not able to use it. Additionally, only the cardholder knows what biometric input is needed.

Figure 6B:
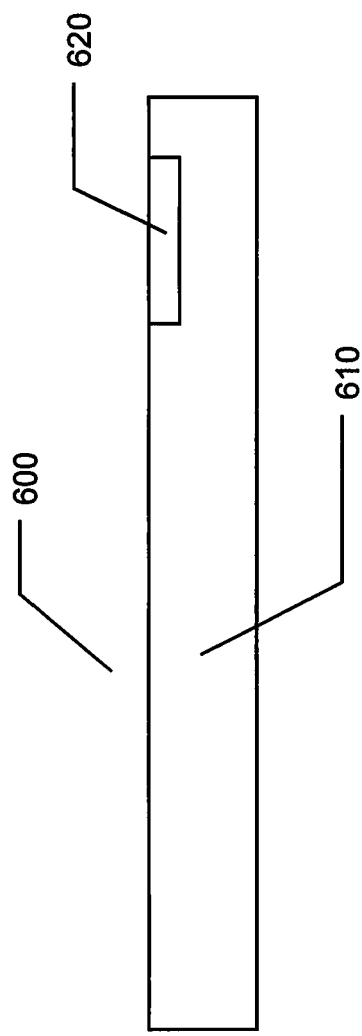
FIGS. 6B-6C are side cross-sectional view drawings illustrating a tamper-proof secure card according to embodiments of the present invention.
Figure 6C:
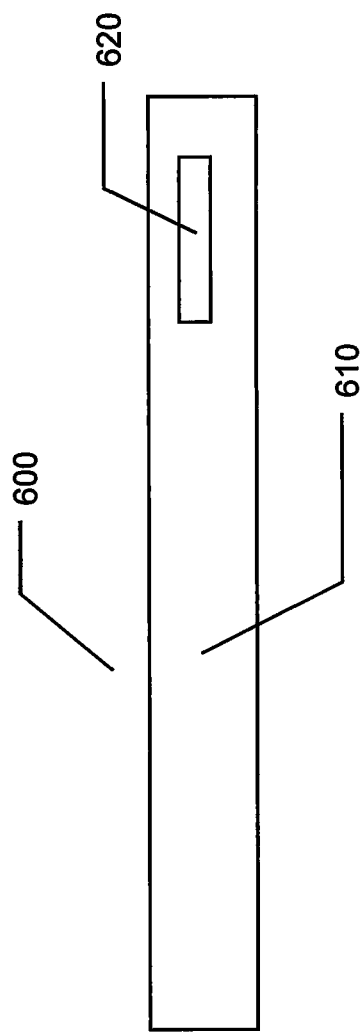

Refer to FIG. 6A, which is a drawing illustrating a tamper-proof secure card according to an embodiment of the present invention and to FIGS. 6B-6C, which are side cross-sectional view drawings illustrating a tamper-proof secure card according to embodiments of the present invention.

In the embodiments illustrated in FIGS. 6A-6C the tamper-proof secure card 600 of the present invention comprises a transparent biometric data section 620 in the card body 610. In these embodiments a chip or memory is not needed to store the user's biometric data. The user's biometric data is etched or printed in the transparent biometric data section 620. For example, the biometric data is laser etched, ink printed, hot stamped, mould stamped, engraved, CNC machined, etc. into or onto the transparent biometric data pattern section 620 of the card body 610.

In the embodiment illustrated in FIG. 6B the biometric data pattern is etched or printed on a top surface of the transparent biometric data section 620.

In the embodiment illustrated in FIG. 6C the biometric data pattern is laser etched, ink printed, hot stamped, mould stamped, engraved, CNC machined, etc. into an internal portion of the transparent biometric data pattern section 620. This prevents degradation of the etching or printing from wear. It also further prevents any attempt at directly tampering with the biometric data.

In embodiments of the present invention when creating the biometric data pattern only a portion of the biometric data pattern is created. For example, only half or 30% of the biometric data pattern for the fingerprint is created. This further protects privacy and increases security.

If the biometric data is re-etched with alternate biometric data or altered, for example by attempting to replace the transparent biometric data section the card reader can easily detect the attempted fraud. For example, the card reader can detect imperfections around the transparent area and the card body or imperfections in the etching.

Since a chip is not utilized in these embodiments the biometric data can not be read or stolen from the integrated circuit. Additionally, the production costs are reduced.

In some embodiments of the present invention a plurality of transparent biometric data sections are provided. This allows for several types or measures of biometric data to be stored on the card.

In use the user provides the card to the card reader and supplies a biometric input to the card reader or a biometric scanner/reader. The card reader then compares the user's biometric input to the biometric data stored in the transparent biometric data section of the secure card.

If the input biometric data and the stored biometric data match, the user is positively identified and authorized to use the card. If the two do not match, the card is rejected and authorization is denied.

Figure 6D:
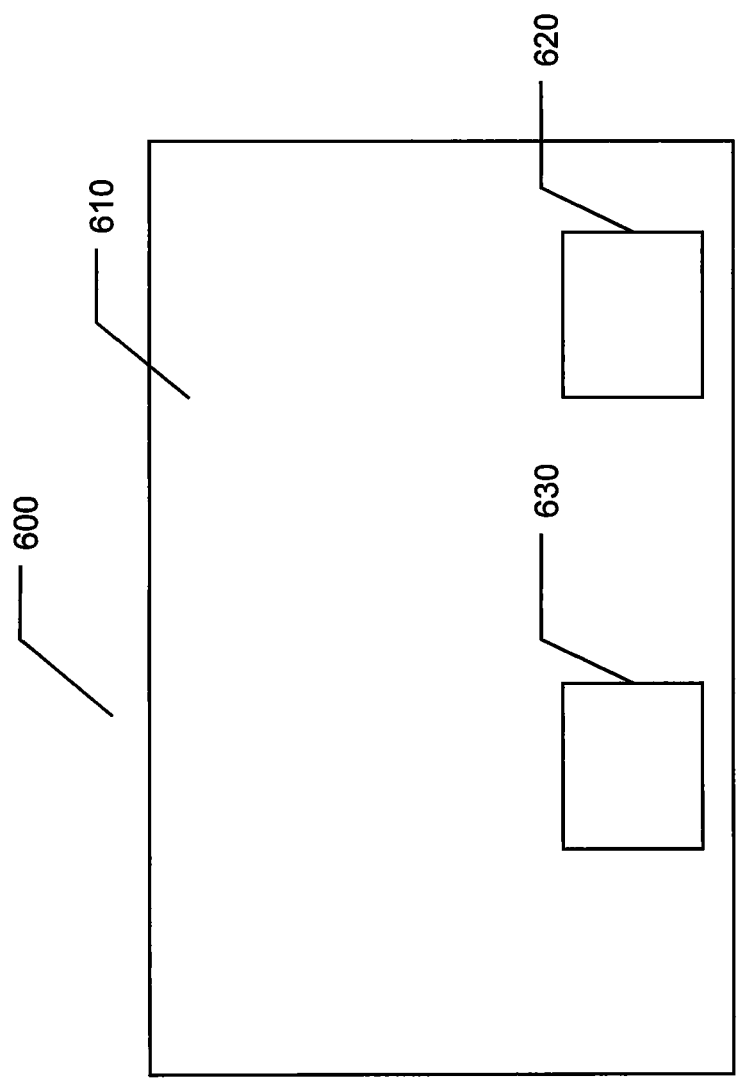
FIG. 6D-6F are drawings illustrating a tamper-proof secure card according to embodiments of the present invention.

Refer to FIG. 6D, which is a drawing illustrating a tamper-proof secure card according to an embodiment of the present invention.

In the embodiment illustrated in FIG. 6D the tamper-proof secure card 600 further comprises a transparent biometric data input area 630. In use the user provides the card 600 to the card reader and supplies a biometric input in or over the transparent biometric data input area 630. Identification and authorization procedures are performed and executed as described regarding FIG. 6A.

Figure 6E:
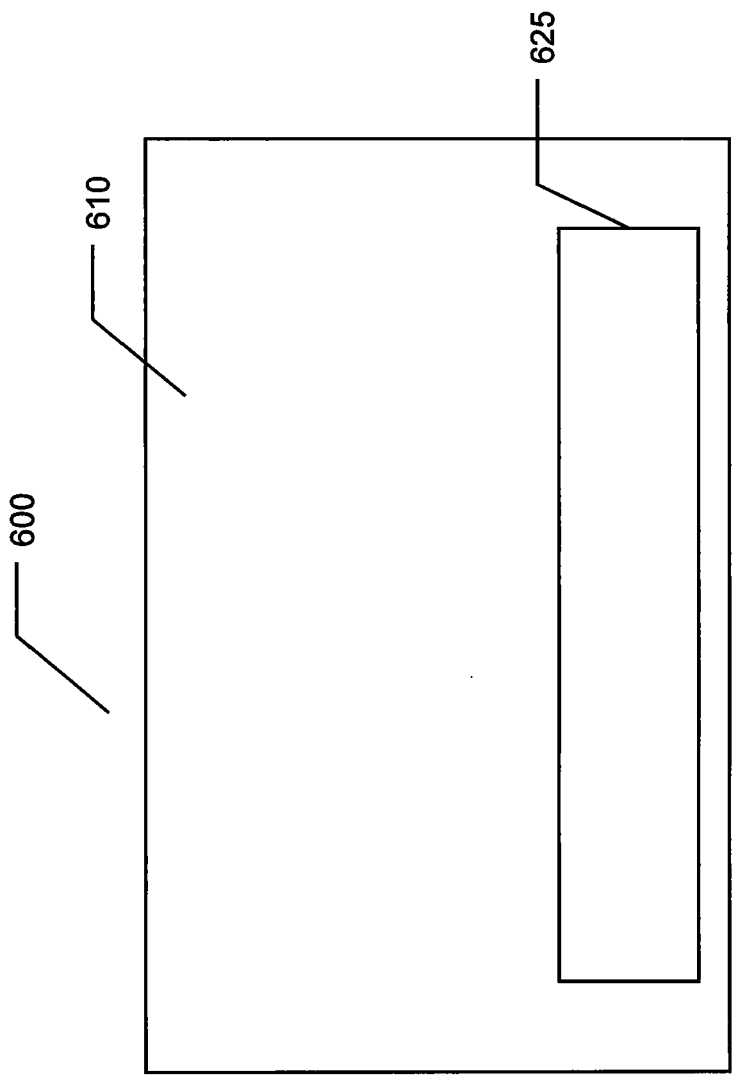

Refer to FIG. 6E, which is a drawing illustrating a tamper-proof secure card according to an embodiment of the present invention.

In the embodiment illustrated in FIG. 6E the tamper-proof secure card of the present invention the transparent biometric data input area and the transparent biometric data section are combined to form a transparent input and stored data section 625 in the card body 610. The function of the transparent input and stored data section 625 is similar to the two transparent elements described in FIG. 6D but only one transparent section 625 is required to fulfill both purposes.

Figure 6F:
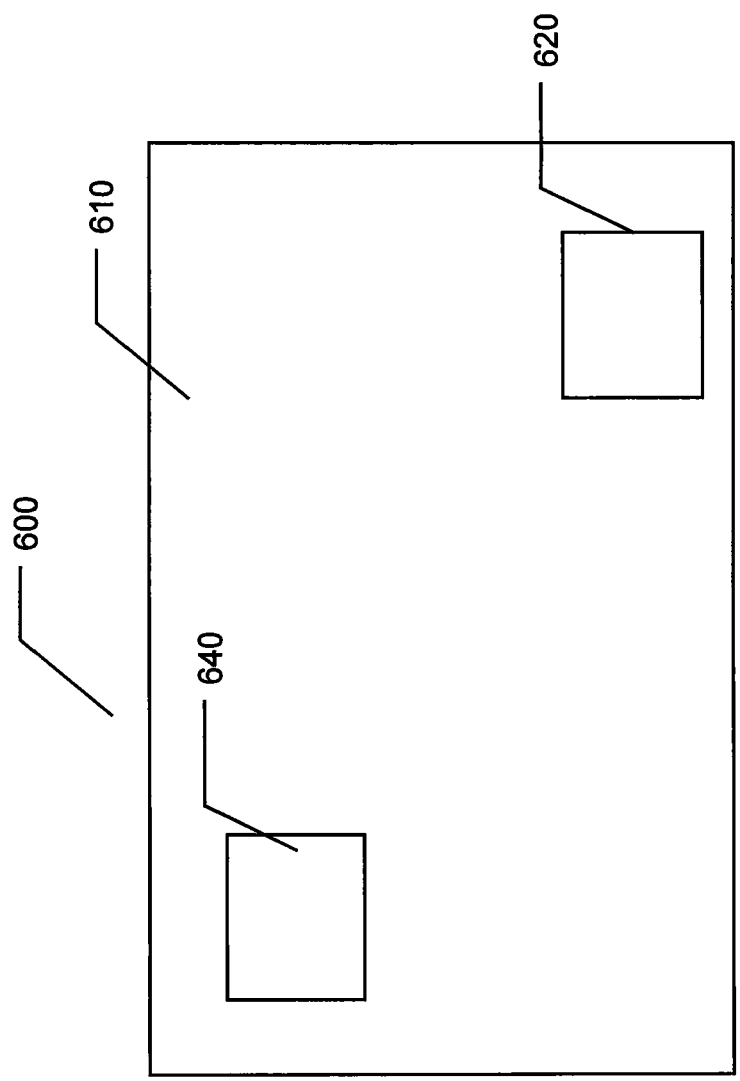

Refer to FIG. 6F, which is a drawing illustrating a tamper-proof secure card according to an embodiment of the present invention.

In the embodiment illustrated in FIG. 6F the tamper-proof secure card of the present invention further comprises an integrated circuit chip 640 for storing the user's biometric data. In this embodiment the user's biometric data is stored in the transparent biometric data section 620 of the card body 610 as well as stored in the chip 640.

In use the user provides the secure card 600 to the card reader and supplies a biometric input. If the biometric input matches the biometric data stored in the transparent biometric data section 620 the card reader reads the biometric data stored in the chip 640. If the input biometric data matches the biometric data stored in the chip 640 the user is identified and authorized to use the card 600.

If any of the input biometric data, the biometric data stored in the transparent section of the card, or the biometric data stored in the chip fail to match each other, the card is rejected and the user is denied authorization to use the card.

This embodiment provides an additional level of security since the chip is not accessed or read from until the input biometric data and the biometric data stored in the transparent biometric data section of the card match. This prevents data being read into the card reader until a first authorization is successful.

In another embodiment the biometric input, the biometric data stored in the transparent section of the card, and the biometric data stored in the chip are read and compared at the same time.

By comparing all three biometrics the chip can not be overwritten with new data because all three biometrics do not match.

Figure 7:
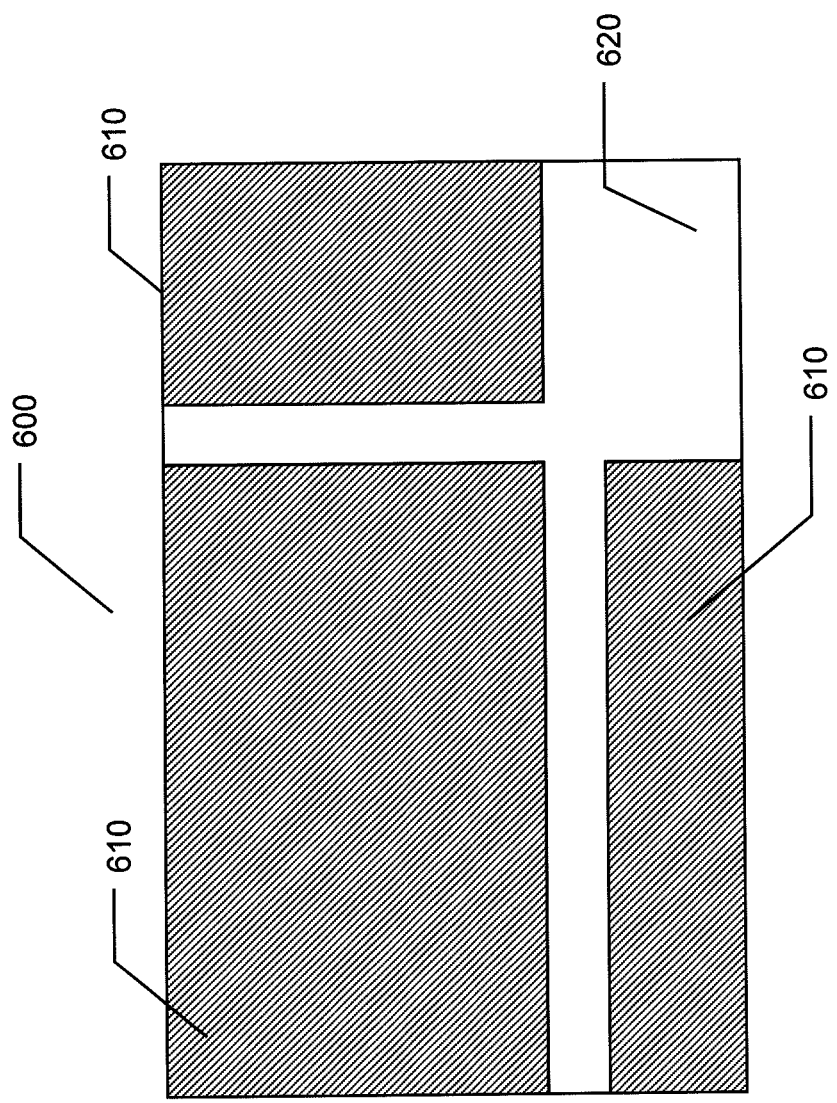
FIG. 7 is a drawing illustrating a tamper-proof secure card according to an embodiment of the present invention.

Refer to FIG. 7, which is a drawing illustrating a tamper-proof secure card according to an embodiment of the present invention.

In the embodiment illustrated in FIG. 7 the tamper-proof secure card of the present invention provides another level of security by improving the ability to detect tampering or altering of the card 600. In this embodiment the transparent biometric data section 620 in the card body 610 extends to the edges of the card body 610. As a result, any tampering or attempt at altering the card 600 can be easily detected. For example, if a thief attempts to replace the transparent biometric data section 620 by cutting out the original biometric etching and replacing it with a new biometric etching, any imperfections in the transparent section are easily detected and the card is rejected. This also provides for any attempt to replace the chip to be easily detected.

Additionally, if a thief tried to replace the entire transparent section 620 the three other opaque sections of the card body 610 would be separated. As shown in FIG. 7, the shaded regions of the card body 610 are opaque. Not only would it be difficult re-attach the four sections of the card body into one piece but the spliced areas of the card would be easily detected and the card would be rejected.

Figure 8:
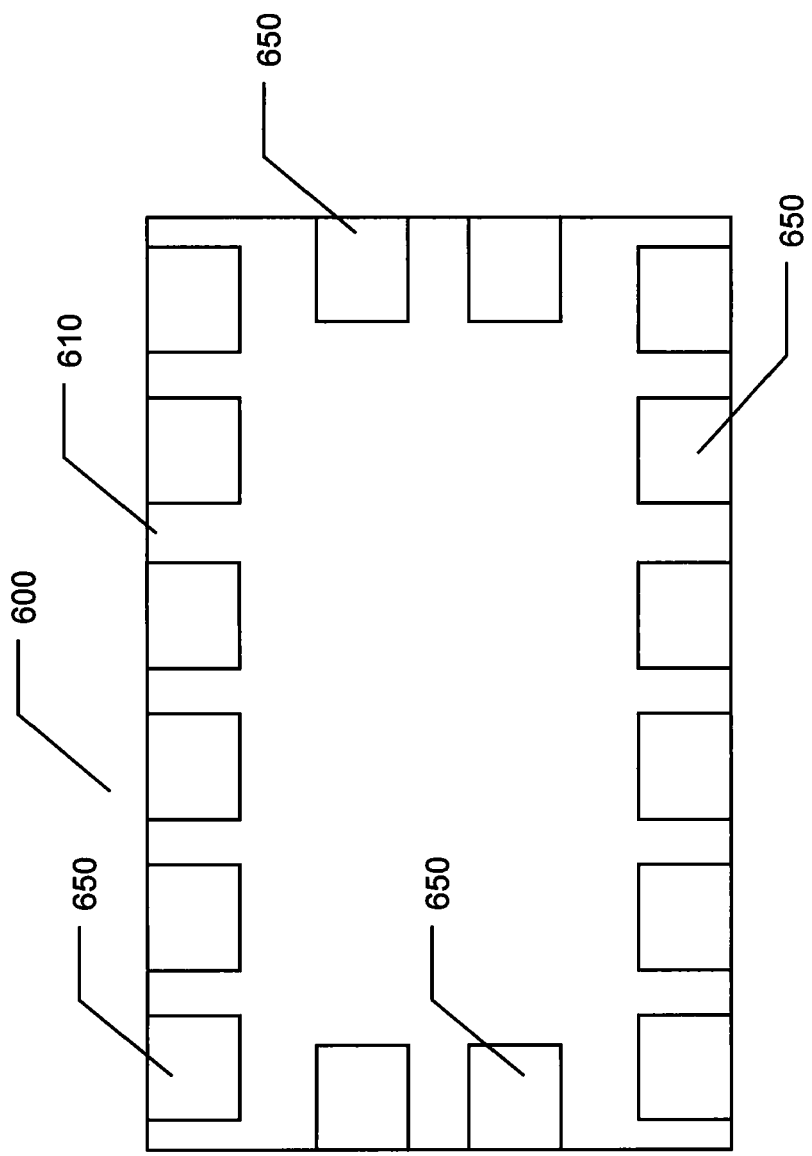
FIG. 8 is a drawing illustrating a tamper-proof secure card with conductive pads according to an embodiment of the present invention.

Refer to FIG. 8, which is a drawing illustrating a tamper-proof secure card with conductive pads according to an embodiment of the present invention.

In the embodiment illustrated in FIG. 8, the tamper-proof secure card 600 of the present invention further comprises a plurality of conductive pads 650. These conductive pads 650 allow the secure card 600 to function similar to a large integrated circuit. The conductive pads 650 are output and/or input contacts that the card reader can access when the card 600 is provided.

Note that while the conductive pads 650 illustrated in FIG. 8 are positioned on the edges of the card other arrangements or positions are provided in embodiments of the present invention. For example, conductive pads are positioned on one edge of the card or positioned in arrangements across the surface of the card.

The conductive pads 650 provide another level of security for the secure card 600. The conductive pads 650 allow the card and card reader to perform various functions. For example, one pad outputs a clock frequency, one pad has a certain resistance or capacitance when measured in reference to another pad or ground, one pad requires a certain voltage level in order for the card to function, one pad is open, one pad is a dummy pad, etc. This allows the card reader to perform various tests to validate the card and user.

In an embodiment of the present invention the card reader performs various tests during the authorization, validation, and/or identification processes. For example, after the user's input biometric data has been confirmed to match biometric data stored in the card, the card reader supplies to and/or reads from the input and output conductive pads on the card. Since each secure card comprises different conductive pad functions for individual users the card reader can easily accept or reject the card according to the various tests. In this embodiment each secure card is coded with unique functions according to each individual card user.

In an embodiment of the present invention a chip is provided to assist in the function test.

In an embodiment of the present invention various electronic components are positioned inside the secure card.

As a result of performing the electrical tests a thief is further prevented from duplicating or altering a card because the circuitry, function, or code can not be altered or known.

In an embodiment of the present invention the conductive pads of provided on the chip where the user's biometric data is stored. In this embodiment the secure card must pass the various electrical tests before the card reader can access the biometric data.

In an embodiment of the present invention if the card reader determines that the user is fraudulent or not authorized to use the card, the card reader provides electrical signals such as a voltage or current to appropriate conductive pads on the secure card and the card or circuitry is destroyed and rendered unusable.

Figure 9A:
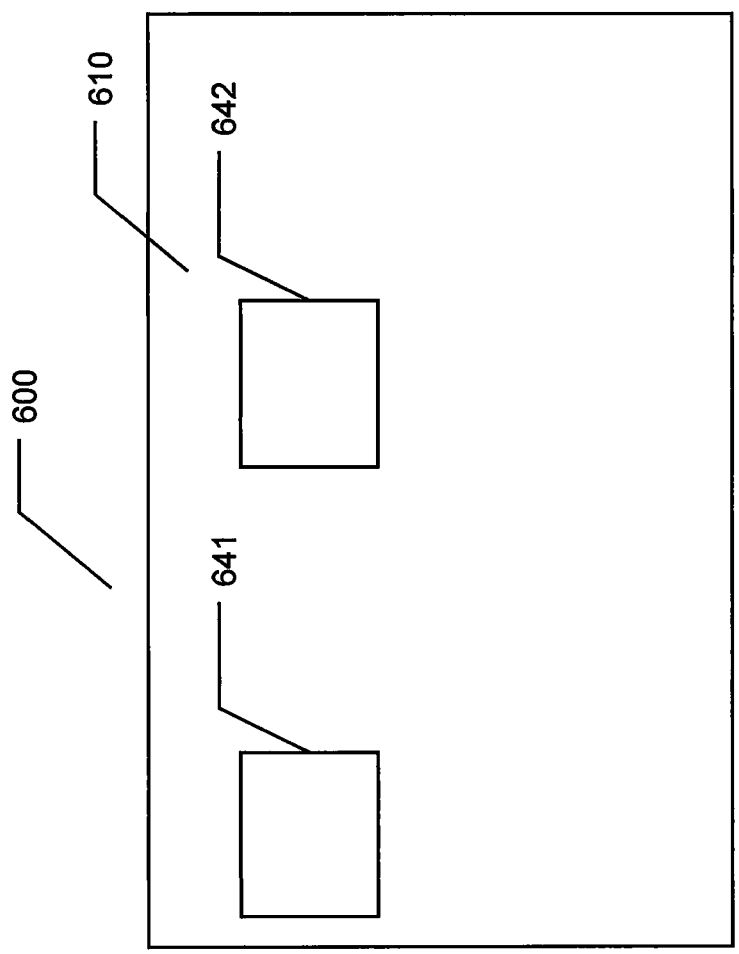
FIG. 9A is a drawing illustrating a tamper-proof secure card with multiple integrated circuit chips according to an embodiment of the present invention.

Refer to FIG. 9A, which is a drawing illustrating a tamper-proof secure card with multiple integrated circuit chips according to an embodiment of the present invention.

In the embodiment illustrated in FIG. 9A the secure card 600 comprises a plurality of integrated circuit chips 641, 642. In this embodiment the chips 641,642 perform different functions. For example, one chip stores the user's biometric data and the other chip stores security card firmware. In this way, the biometric data can not be read from the first chip until the secure card passes security test according to the firmware in the second chip. Alternatively, one chip stores one set of the user's biometric data and the other chip stores a different set of the user's biometric data. The second set of biometric data can not be read until the first set of biometric data has been confirmed as valid.

Figure 9B:
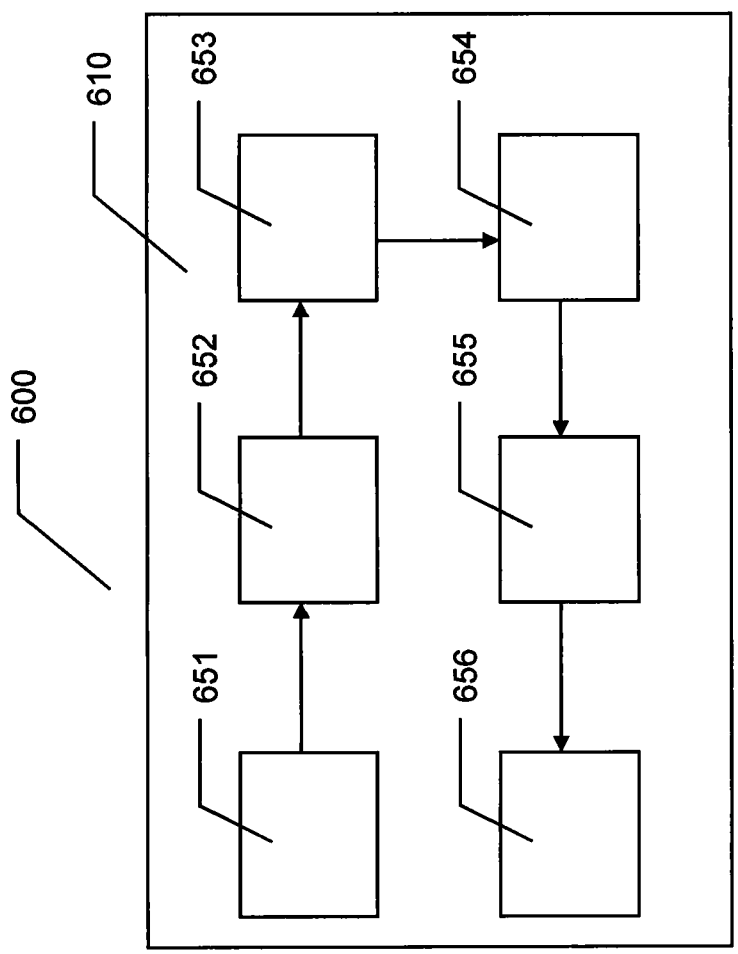
FIG. 9B is a drawing illustrating a tamper-proof secure card with multiple integrated circuit chips in a gated staircase logic arrangement according to an embodiment of the present invention.

Refer to FIG. 9B, which is a drawing illustrating a tamper-proof secure card with multiple integrated circuit chips in a gated staircase logic arrangement according to an embodiment of the present invention.

In the embodiment illustrated in FIG. 9B the secure card comprises a plurality of integrated circuit chips 651-656 positioned in a serial arrangement. In this arrangement each function on a chip must be confirmed before the next chip is enabled and accessed.

Each chip 651-656 performs a separate function. For example, security firmware, testing, coding, storing biometric data, memory, authorization level, access level, etc.

This arrangement performs in a gated staircase logic manner where access to the next staircase (level) is blocked by a locked gate until the proper key has been provided. If at any time in the process the proper key is not presented no further progress is allowed and the remaining chips cannot be accessed.

For example, the user supplies a first biometric input and the card reader confirms that the biometric input matches the biometric data stored in the first chip. The card reader then performs various electrical tests on the section chip containing security firmware or circuitry. If the test results match the user's unique code the third chip is enabled. The user then supplies a second biometric input and the card reader determines that the second biometric input does not match the biometric data stored in the third chip. The card reader rejects or invalidates the card and authorization is denied. In this way, the data contained in fourth, fifth, and sixth chip is protected and cannot be accessed.

Figure 10:
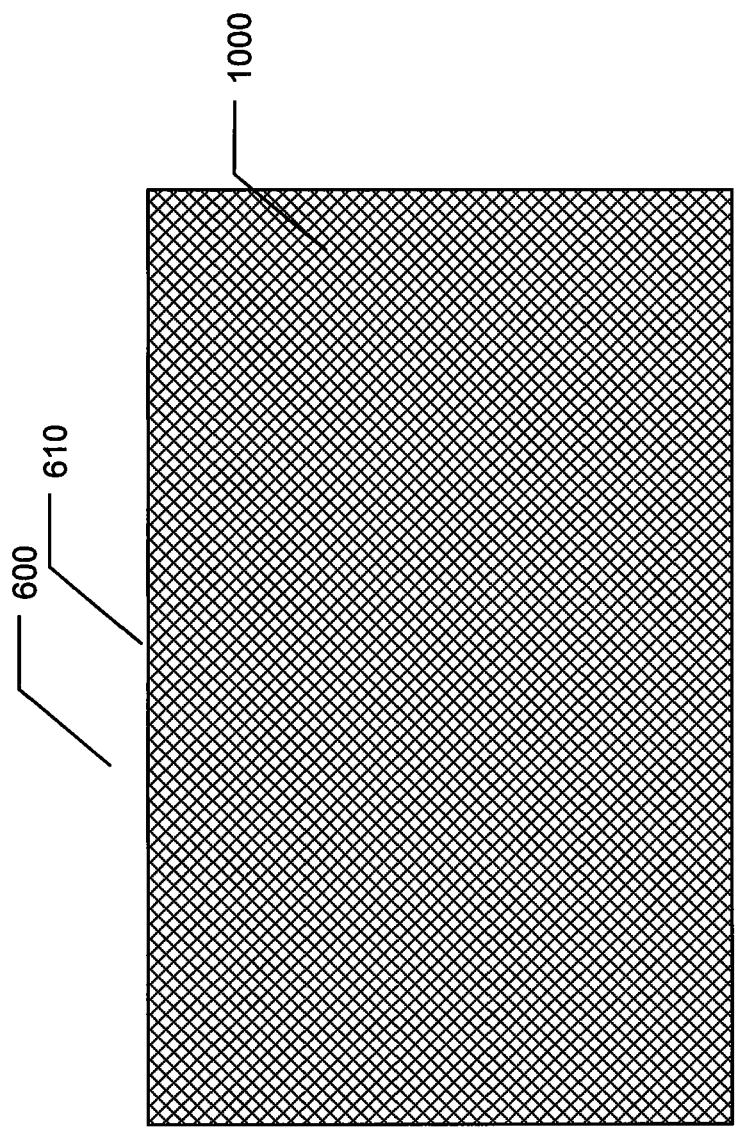
FIG. 10 is a drawing illustrating a tamper-proof secure card with multiple conductive traces according to an embodiment of the present invention.

Refer to FIG. 10, which is a drawing illustrating a tamper-proof secure card with multiple conductive traces according to an embodiment of the present invention.

In the embodiment illustrated in FIG. 10, the secure card 600 of the present invention comprises a plurality of conductive traces 1000, conductive lines, or nano-wires inside the card body 610.

If any tampering, altering, replacing of components, cutting, or modification to the card is attempted the conductive traces 1000 will be damaged and the card reader can easily detect these actions have been performed and the card will be rejected and/or invalidated.

In another embodiment of the present invention the secure card comprises a conductive layer inside the body of the card. For example, a layer of conductive material sandwiched inside the card.

In an embodiment of the present invention tests are performed to determine if the conductive traces have been damaged.

In an embodiment of the present invention the secure card is invalidated or made inoperable after a single biometric test fails. In this embodiment the user must apply for a new card or physically request authorization. In other embodiments a predetermined number of test failures are accepted before the card is invalidated.

In an embodiment of the present invention the secure card further comprises an identification tag, for example an RF tag, an RFID tag, or a ubiquitous identification tag. This allows the cardholder's location to be determined or tracked. This also allows for storage of additional identification information to be used during identification verification.

In embodiments of the present invention different combinations of chips, etched areas, transparent biometric input areas, conductive pads, conductive traces, and conductive layers are utilized thereby increasing the level of security and tamper detection.

In embodiments of the present invention the secure card comprises other shapes than rectangular. For example, the shape of the secure card is circular, triangular, polygonal, or square.

In an embodiment of the present invention the correct position to place the secure card to the card reader is such that only the user knows the correct orientation.

In an embodiment of the present invention the biometric data stored in the transparent biometric data section of the card body is encrypted. For example, the biometric data is encrypted with a password, code, or other biometric data. For example, two biometric inputs are used with a security algorithm to form the image to be etched in the transparent section. Only the user will know which two biometrics to input.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A method for confirming identity of a user of a tamper-proof secure card comprising:

receiving biometric data input by the user through a transparent input area of the tamper-proof secure card, the transparent input area allowing a card reader or a verification machine to receive the biometric data input by the user through the transparent input area, and the transparent input area preventing the user from directly touching the card reader or the verification machine;

comparing the biometric data input with an emergency code preselected by the user and stored in the tamper-proof secure card;

notifying an appropriate authority if the biometric data input matches the emergency code;

displaying an artificial account balance lower than a current account balance if the biometric data input matches the emergency code;

comparing input biometric data with biometric data stored in a transparent biometric data section of the tamper-proof secure card;

confirming identity of the user if the input biometric data matches the biometric data stored in the transparent biometric data section of the tamper-proof secure card;

rejecting the secure card if the input biometric data does not match the biometric data stored in the transparent biometric data section of the tamperproof secure card;

comparing the input biometric data and the biometric data stored in the transparent biometric data section of the tamper-proof secure card with a unique card number created using biometric data of the user and stored in the tamper-proof secure card by a card issuing institution prior to issuing the tamper-proof secure card to the user; and rejecting the secure card if the input biometric data and the biometric data stored in the transparent biometric data section of the tamper-proof secure card do not match the unique card number.

2. The method for confirming identity of a user of a tamper-proof secure card of claim 1, further comprising:

invalidating the tamper-proof secure card if the input biometric data does not match the biometric data stored in the transparent biometric data section of the tamper-proof secure card so that the secure card is rendered permanently unusable and the tamper-proof secure card can not be used again.

3. A method for confirming identity of a cardholder of a tamper-proof secure card comprising:

creating a unique card number from an authorized cardholder's biometric data by a card issuing institution prior to issuing the tamper-proof secure card to the cardholder;

storing the unique card number on the secure card by the card issuing institution prior to issuing the tamper-proof secure card to the cardholder;

receiving biometric data input by the cardholder;

comparing input biometric data with biometric data stored in the secure card;

confirming identity of the cardholder if the input biometric data matches the biometric data stored in the secure card; and allowing access to the unique card number if identity of the cardholder is confirmed;

comparing the input biometric data and the biometric data stored in the secure card with the unique card number; and permanently invalidating the tamper-proof secure card if the input biometric data and the biometric data stored in the secure card do not match the unique card number by destroying circuitry in the tamper-proof card so that the tamper-proof secure card can not be used again.

* * * * *